(12) United States Patent
Lovelace et al.

(10) Patent No.: US 10,621,121 B2
(45) Date of Patent: Apr. 14, 2020

(54) MEASUREMENT AND OPTIMIZATION OF COMMAND SIGNAL TIMING MARGINS

(71) Applicant: Intel Corporation, Santa Clara, CA (US)

(72) Inventors: John V. Lovelace, Driftwood, TX (US); Christina Jue, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/829,524

(22) Filed: Dec. 1, 2017

(65) Prior Publication Data
US 2019/0034365 A1    Jan. 31, 2019

(51) Int. Cl.
*G06F 11/10* (2006.01)
*G06F 13/16* (2006.01)
*G06F 9/30* (2018.01)

(52) U.S. Cl.
CPC ...... *G06F 13/1689* (2013.01); *G06F 9/30076* (2013.01); *G06F 11/1004* (2013.01); *G06F 11/1052* (2013.01); *G06F 13/1684* (2013.01)

(58) Field of Classification Search
CPC ..................................................... G06F 11/10
USPC .................................................. 714/E11.023
See application file for complete search history.

(56) References Cited

U.S. PATENT DOCUMENTS

| 5,375,084 | A | * | 12/1994 | Begun | G06F 12/0684 |
| | | | | | 365/230.03 |
| 5,606,662 | A | * | 2/1997 | Wisor | G06F 11/1052 |
| | | | | | 714/48 |
| 7,451,270 | B1 | * | 11/2008 | Criswell | G06F 11/1052 |
| | | | | | 711/112 |
| 2005/0081085 | A1 | * | 4/2005 | Ellis | G06F 11/1044 |
| | | | | | 714/6.2 |
| 2007/0204200 | A1 | * | 8/2007 | Gower | G06F 11/1044 |
| | | | | | 714/767 |
| 2016/0011940 | A1 | * | 1/2016 | Hu | G06F 11/108 |
| | | | | | 714/764 |

* cited by examiner

*Primary Examiner* — Min Huang
(74) *Attorney, Agent, or Firm* — Compass IP Law, PC

(57) ABSTRACT

Techniques for training a command/address (C/A) bus, including training internal command/address (C/A) signal lines of a memory module are described. In one example, a method of training a C/A bus involves a memory controller transmitting a first command to a DRAM with parity checking enabled, the first command to include valid parity and chip select asserted. The memory controller transmits commands in cycles before and after the first command to at least one DRAM with parity checking disabled, the commands to include invalid parity and chip select asserted. In response to detecting a parity error, the memory controller modifies a timing parameter to adjust timing for the internal C/A signal lines of the memory module.

20 Claims, 14 Drawing Sheets

PAR Training Pattern, transitioning high 402

| PAR | ACT_N | RAS_N/ MA16 | CAS_N/ MA15 | WE_N/ MA14 | Target CS_N | Non-Target CS | Other address signals not being margined | Command |
|---|---|---|---|---|---|---|---|---|
| 0 | 1 | 1 | 1 | 1 | 1 | 0 | BG1 = 1, else = 0 | NOP |
| 1 | 1 | 1 | 1 | 1 | 1 | 1 | BG1 = 1, else = 0 | NOP |
| 0 | 1 | 1 | 1 | 1 | 1 | 0 | BG1 = 1, else = 0 | NOP |

PAR Training Pattern, transitioning low 404

| PAR | ACT_N | RAS_N/ MA16 | CAS_N/ MA15 | WE_N/ MA14 | Target CS_N | Non-Target CS | Other address signals not being margined | Command |
|---|---|---|---|---|---|---|---|---|
| 1 | 1 | 1 | 1 | 1 | 1 | 1 | BG1 = 1, else = 0 | NOP |
| 0 | 1 | 1 | 1 | 1 | 1 | 0 | BG1 = 1, else = 0 | NOP |
| 1 | 1 | 1 | 1 | 1 | 1 | 1 | BG1 = 1, else = 0 | NOP |

ACT_N Training Pattern 406

| PAR | ACT_N | RAS_N/ MA16 | CAS_N/ MA15 | WE_N/ MA14 | Target CS_N | Non-Target CS | Other address signals not being margined | Command |
|---|---|---|---|---|---|---|---|---|
| 1 | 1 | 1 | 1 | 1 | 1 | 1 | 0 | NOP |
| 1 | 0 | 1 | 1 | 1 | 1 | 1 | 0 | ACT |
| 1 | 1 | 1 | 1 | 1 | 1 | 1 | 0 | NOP |

FIG. 4A

Address Training Pattern, transitioning high 408

| PAR | ACT_N | RAS_N/MA16 | CAS_N/MA15 | WE_N/MA14 | Target CS_N | Non-Target CS | Other address signals not being margined | Address signal being margined | Command |
|---|---|---|---|---|---|---|---|---|---|
| 1 | 1 | 1 | 1 | 1 | 1 | 0 | 0 | 0 | NOP |
| 1 | 1 | 1 | 1 | 1 | 0 | 1 | 0 | 1 | NOP |
| 1 | 1 | 1 | 1 | 1 | 1 | 0 | 0 | 0 | NOP |

Address Training Pattern, transitioning low 410

| PAR | ACT_N | RAS_N/MA16 | CAS_N/MA15 | WE_N/MA14 | Target CS_N | Non-Target CS | Other address signals not being margined | Address signal being margined | Command |
|---|---|---|---|---|---|---|---|---|---|
| 1 | 1 | 1 | 1 | 1 | 1 | 0 | 0 | 1 | NOP |
| 1 | 1 | 1 | 1 | 1 | 0 | 1 | 0 | 0 | NOP |
| 1 | 1 | 1 | 1 | 1 | 1 | 0 | 0 | 1 | NOP |

FIG. 4B

MEASUREMENT AND OPTIMIZATION OF COMMAND SIGNAL TIMING MARGINS

FIELD

The descriptions are generally related to the measurement and optimization of command signal timing margins, and more particular descriptions are related to measurement and optimization of command signal timing margins from a memory device register (register clock driver (RCD)) to DRAMs.

BACKGROUND

As processors continue to increase in performance and throughput, the exchange of data from the memory devices to the processor can create a bottleneck in electronics and computing devices. One way to increase throughput is to increase the frequency at which memory signal lines (such as the data bus (DQ) and command/address bus (C/A bus)) are run. However, as signaling gets faster, the risk of errors increases due to the difficulty of meeting minimum margin guidelines at the higher frequencies. A failure to meet minimum margin guidelines can result in a failure on the command interface that is not detectable or correctable, which can cause silent data corruption.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" or "examples" are to be understood as describing a particular feature, structure, and/or characteristic included in at least one implementation of the invention. Thus, phrases such as "in one embodiment" or "in one example" appearing herein describe various embodiments and implementations of the invention, and do not necessarily all refer to the same embodiment. However, they are also not necessarily mutually exclusive.

FIGS. 4A-4B include charts illustrating examples of command/address (C/A) bus training patterns.

Descriptions of certain details and implementations follow, including a description of the figures, which may depict some or all of the embodiments described below, as well as discussing other potential embodiments or implementations of the inventive concepts presented herein.

DETAILED DESCRIPTION

Described herein are techniques for measuring and optimizing command signal timing margins, which can also be referred to as "training" the command/address (C/A) bus. Conventional techniques for training the C/A bus are insufficient for certain memory architectures. For example, some conventional techniques are effective for training the "frontside" C/A bus, but fail to train the "backside" C/A bus. For example, some memory modules include logic called a "register clock driver" or "registering clock driver," which can be abbreviated as a "register" or "RCD." The RCD receives transactions from the memory controller and sends valid transactions to one or more DRAMs of the memory module. In such architectures, the frontside C/A bus is between the memory controller and the RCD, and the backside C/A bus is between the RCD and the DRAMs (i.e., C/A signal lines internal to the memory module).

In one example, a technique for training the C/A bus enables training of both the frontside and backside C/A signals, unlike conventional techniques. For example, the memory controller can send a sequence of commands that have CS asserted: one command with valid parity between two commands with invalid parity. The command with valid parity targets a DRAM with parity checking enabled, while the commands with invalid parity target one or more DRAMs with parity checking disabled. Parity checking is also disabled for the RCD, to cause RCD to forward all three commands to the DRAMs. If timing margins meet minimum margin guidelines, then the DRAM that has parity checking enabled does not signal a parity error. However, if timing margins fail to meet the minimum margin guidelines, then the DRAM will signal a parity error. The memory controller can then adjust timing of one or more signals on the memory module, such as by adding a delay to one or more of the internal C/A signal lines, the internal CS signal lines, or internal clock (CK) signal lines. Thus, such techniques enable training the backside C/A bus in addition to the frontside C/A bus, unlike conventional techniques.

Figure 1:
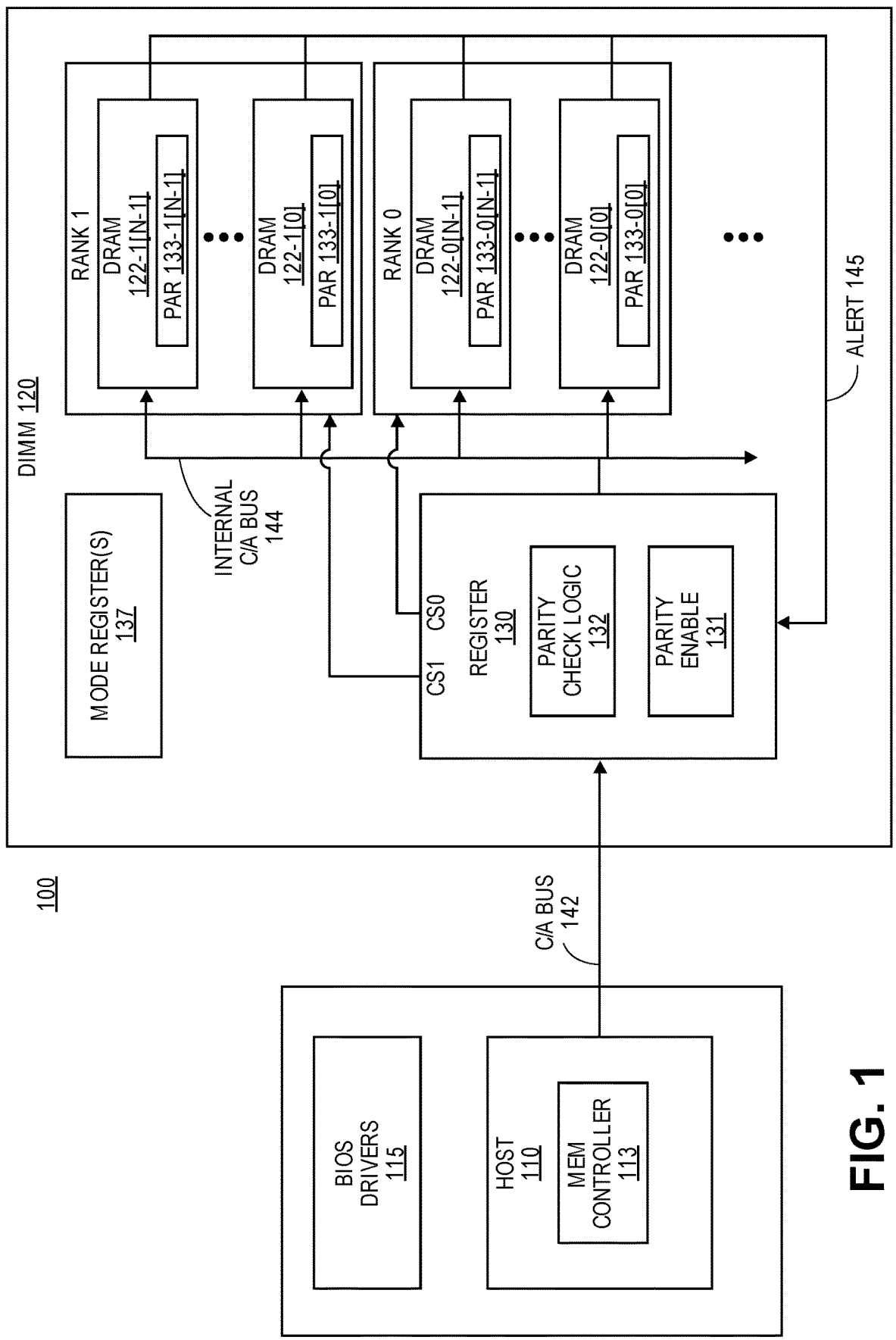
FIG. 1 is a block diagram of an example of a system with a memory module including a register clock driver (RCD) and internal command/address (C/A) signal lines that can be trained in accordance with techniques described herein.

FIG. 1 is a block diagram of an example of a system with a memory module including a register clock driver (RCD) and internal command/address (C/A) signal lines that can be trained in accordance with techniques described herein. Host 110 represents a processor or a memory controller, or both. In the illustrated example, the host 110 is shown as including a memory controller 113. In one example, the host 110 includes a central processing unit (CPU) of the system 100, which can include an embedded memory controller (iMC) or a separate memory controller. In one example, the host 110 can include a graphics processor or graphics processing unit (GPU) that includes or couples to a memory controller to couple to memory. The system 100 also includes logic 115 to enable configuring the hardware and interfacing between elements of the software stack (such as the operating system, filesystem, etc.) and the hardware. Such logic 115 can include the basic input output system (BIOS) of system 100, device drivers, or both. In one example, the logic 115 causes the memory controller to perform C/A bus training in accordance with examples described herein.

DIMM 120 represents a memory module with multiple memory devices, and can generically be referred to as "memory." The DIMM 120 can be, for example, a registered DIMM (RDIMM), a load-reduced DIMM (LRDIMM), or other DIMM that includes an RCD. In one example, system 100 includes multiple DIMMs 120, each of which include multiple memory devices or DRAM devices. DIMM 120 is illustrated to include register 130, which can be an RCD as mentioned above. In one example, the register 130 includes logic to control the transmission of commands to the DRAM devices. A register refers to a logic circuit that can buffer signals to the memory. In one example, the register 130 can also store configuration settings related to the exchange of signals between the register and DRAMs. Register 130 could alternatively be a buffer that buffers the signals, but may not register the memory devices or store specific I/O settings relative to each memory device. Buffering the signal can refer to temporarily storing a signal and re-driving the signal. For ease of use, the term "register" will be used in the following description, but the storing can be in a register or buffer or other storage device.

In one example, the register 130 is part of a DIMM controller (not specifically shown). The DIMM controller refers to a controller or control logic that controls the sending of signals to and from the DIMM 120. The DIMM controller can manage timing and signaling on the DIMM 120. The DIMM controller can be implemented as a microcontroller, microprocessor, or other controller. The DIMM controller will be understood as being separate from a controller on the individual DRAM devices, and separate from the memory controller of the host. In one example, the register 130 is separate from the DIMM controller.

In one example, the register 130 or a DIMM controller includes parity check logic 132. Parity check logic can include logic to enable the determination of parity on incoming commands, to compare the parity computation against a received parity signal. Simple parity is typically performed as Even/Odd, with a zero parity bit representing even parity, and a one parity bit representing odd parity. Even/Odd parity can be computed via multiple stages of XOR (exclusive OR) or other combinatorial logic. It will be understood that since XOR functions are commutative, any combination of XOR on the inputs should result in the same outcome. The number of stages of XOR is determined by the number of signals lines over which to compute parity. Parity for the command buses can be simplified with narrower buses, by reducing the number of XOR stages. In one example, the host 110 includes control logic to trigger sending of a parity bit signal having the same timing as the command and address bits. Thus, the parity bit signal will match the data rate of the command and address bits. In the illustrated example, the register 130 also include a register 131 (such as a mode register) to store one or more bits to enable or disable parity checking for the register 130. For ease of reference, registers to store bits related to configuration settings or to store other information will be referred to as "mode registers" in the following description. However, it will be understood that registers can be mode registers or other registers, such as multi-purpose registers.

In one example, register 130 receives the signal lines in a point-to-point connection from host 110, and sends signals to the DRAM devices via a multi-drop bus or fly-by topology, where all devices are coupled to a common bus or common signal line. In the illustrated example, two ranks are shown (rank 0 and rank 1), with each rank including multiple DRAMs. However, the DIMM 120 can include more than two ranks. Furthermore, the DIMM 120 can include multiple channels, each of which may include multiple ranks. For example, although a single channel with two ranks is shown, the DIMM 120 can include multiple channels, which each may include one or more ranks. Rank 0 is shown as including N DRAM devices, labeled DRAMs 122-0[0]-122-0[N-1] and Rank 1 is shown as including N DRAM devices, labeled as DRAMs 122-1[0]-122-1[N-1]. It will be understood that reference to DRAM devices 122 is a shorthand to represent the 2N DRAM devices illustrated. In one example, each DRAM 122 includes circuitry to perform a parity check on signals received over the internal C/A bus 144. For example, each DRAM 122 includes parity checking circuitry 133 (which is a shorthand to represent 133-0[0]-133-0[N-1] and 133-1[0]-133-1[N-1]) to perform a parity check. Each DRAM may also include a register to store one or more bits to enable or disable parity checking for the DRAM. A mode register to enable or disable parity for each DRAM can be included as part of circuitry 133, or separate from circuitry 133. Although each DRAM may be individually configurable to enable or disable parity checking, it is common for parity to be enabled or disabled for an entire rank (such that all DRAMs on a given rank either have parity enabled or disabled). However, other implementations may involve enabling or disabling parity checking for DRAMs individually rather than on a rank-basis. Enabling or disabling parity for a particular DRAM (e.g., via a per DRAM addressability (PDA) feature), can enable measurement and evaluation of routing from the register to the DRAMs to ensure margins are good for all DRAMs on the module.

Referring now to the C/A bus, the system 100 includes a frontside C/A bus 142 and a backside C/A bus 144. The frontside C/A bus 142 can also be referred to as a host-side portion of the C/A bus. The backside C/A bus 144 can also be referred to as a memory-side portion of the C/A bus, or an internal C/A bus. The frontside C/A bus 142 carries command and address signals from the host 110 to the register 130 of the DIMM 120. The backside C/A bus 144 carries the command and address signals of C/A bus 142 to the DRAMs 122. System 100 also includes one or more data buses (e.g., DQ signal lines), which are not explicitly illustrated, for purposes of simplicity in the drawing. The data rate of the C/A and data buses can be DDR, referring to the transfer of a bit of data on every clock edge, or SDR, referring to the transfer of a data bit on only every other clock edge.

As mentioned briefly above, conventional C/A bus training techniques can be used to train the frontside C/A bus 142, but not to train the backside C/A bus 144 in memory architectures such as illustrated in FIG. 1. In some architectures, the register 130 only sends commands to the DRAMs when CS is asserted. For example, some architectures include registers that do not have an option to pass through Command/Address (CA) signal state during deselect cycles, which makes it difficult to measure the DRAM command margins in such systems. Conventional parity-based training techniques involve sending signals with CS deasserted (e.g., de-select commands), which causes the register 130 to not forward the signals to the DRAMs. In one such example, the register 130 is configured to have a weak driver (e.g., float the C/A outputs from the register) when a de-select command is received. When the register floats the C/A outputs, the register does not create sufficiently deterministic transitions on the signal lines (e.g., when going from a de-select command, to a select command, to a de-select command). Therefore, such techniques are ineffective at accurately measuring the margins of the backside C/A signals between the register and the DRAMs. Without accurate margin measurement, the command setup/hold times cannot be optimized or guaranteed to meet minimum margin guidelines at higher frequencies. A failure on this DRAM command interface is typically not detectable or correctable in normal mode and could cause silent data corruption.

Figure 2:
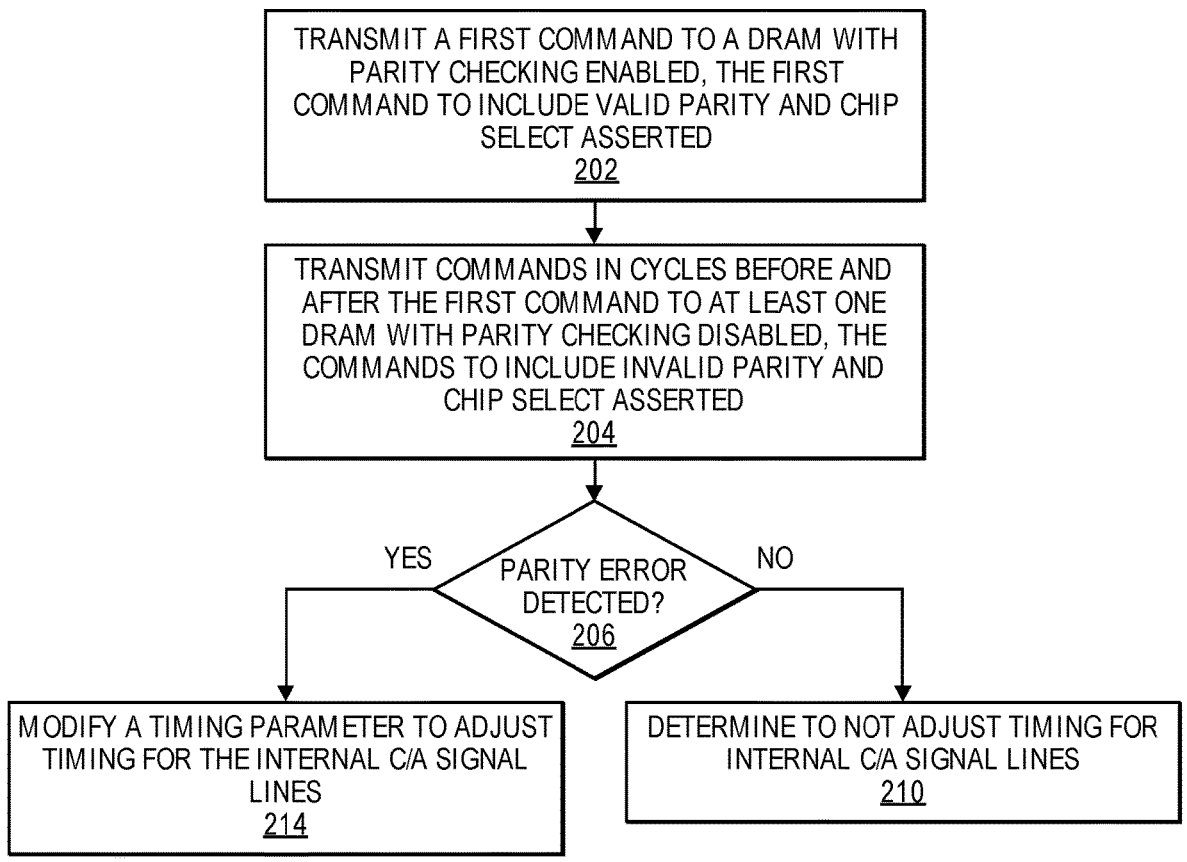
FIG. 2 is a flow diagram illustrating an example of a method performed by a memory controller to train a command/address (C/A) bus.

In one example of a training technique that is effective for training the backside C/A bus 142, the host 110 (e.g., the memory controller 113 of the host 110) sends a number of commands that the register 130 sends to the DRAMs 122. For example, FIG. 2 is a flow diagram illustrating an example of training a command/address (C/A) bus, including training the internal C/A signal lines (e.g., the internal C/A bus 144). The method 200 of FIG. 2 will be described below with reference to the system 100 of FIG. 1. However, systems having additional or different elements than the system 100 may also perform the method 200 of FIG. 2. In one example, the method 200 of FIG. 2 can be performed by a memory controller or other logic on the host, such as the host 110 of FIG. 1. Logic 115 of FIG. 1, such as the BIOS and/or drivers cause the memory controller 113 to perform the method 200.

Referring to block 202 of the flow diagram, the memory controller transmits a first command to a DRAM with parity checking enabled. The first command includes valid parity and chip select asserted. At block 204, the memory controller transmits commands in cycles before and after the first command to at least one DRAM with parity checking disabled. The commands include invalid parity and chip select asserted. Thus, in the illustrated example, the memory controller transmits three commands: a command with valid parity in between two commands with invalid parity. All three commands include chip select asserted, which causes the register of the memory module to forward the commands to the selected DRAMs. In one example, training the C/A bus can involve transmitting the commands (e.g., a sequence of commands such as the commands described in blocks 202 and 204) for each signal line of the C/A bus. For example, the memory controller can transmit the sequence of commands for a parity signal (PAR), an activate signal (ACT), address signals (A[17:0], C[2:0], BG[1:0], BA[1:0]), row address strobe (RAS), column address strobe (CAS), and a write enable signal (WE). Other implementations can include additional, fewer, or different signals. In one example, the memory controller transmits the sequence of commands twice for each signal line: once with a transition of low-high-low on the C/A signal line, and a second time with a transition of high-low-high on the C/A signal line.

After transmitting the commands, the memory controller determines whether a parity error is detected, at block 206. The memory controller can determine whether a parity error has occurred by mechanisms such as: reading a register (such as by transmitting a mode register read command to read one of the mode registers 137 of FIG. 1), by receiving a signal via a signal line (such as a dedicated signal line) to indicate a parity error, or via any other mechanism to determine whether a parity error has occurred. If a parity error has occurred (206 YES branch), the memory block modifies a timing parameter to adjust timing for the internal C/A signal lines, at block 214. For example, the memory controller can use the parity feedback while margining to determine if a setting passes or fails. The memory controller determines the margins by sweeping a range of settings (e.g., sweeping over a range of delays for internal signal lines such as the internal C/A signal lines, the internal CS lines, and the internal clock (CK) signal lines). For example, for each setting over which to sweep, the memory controller: modifies the delay parameters, transmits the transactions with desired patterns for training, checks the ALERT (or ALERT#) signal to determine if a parity error occurred, and determines the delay settings caused a "pass" (if no parity error detected) or "failure" (if parity error detected). If the memory controller does not detect a parity error, (206 NO branch), the memory controller determines that timing adjustments are not needed for the internal C/A signal lines, at block 210. The memory controller calculates the margins by determining which settings resulted in a transition from failure to passing, or vice versa. Based on the margins, the memory controller can then determine which delay parameters to modify. Thus, although the method 200 only shows the sequence of commands being sent once, training the C/A bus typically involves repeating the operations in method 200 multiple times to test a wide range of timing parameters.

After collecting the CA margins for each target rank on the DIMM, the worst case combined margins can be determined. Using the worst case setup and hold margins, CA timing can be determined (e.g., the best CA timing parameters based on the results of the training) can be programmed in the register for normal operation. The memory controller can modify a timing parameter by, for example, modifying the value of one or more registers of the memory module. For example, the memory module can include registers (e.g., mode registers 137)) that specify delays to be added to one or more signal lines. For example, delays can be added to the internal C/A signal lines, the CS lines, or to clock (CK) signal lines. If the available CA margins are too low for reliable operation, then the DIMM could be eliminated from the system memory map. In one example, such as for validation and debug purposes, the setup and hold margins of individual CA signals can be determined per rank. Further isolation of the DRAM device within the rank is possible by reading the DRAM MPR location that sampled the CA parity error. This could also enable detection of DIMM manufacturing issues and improve future DIMM designs.

Figure 3:
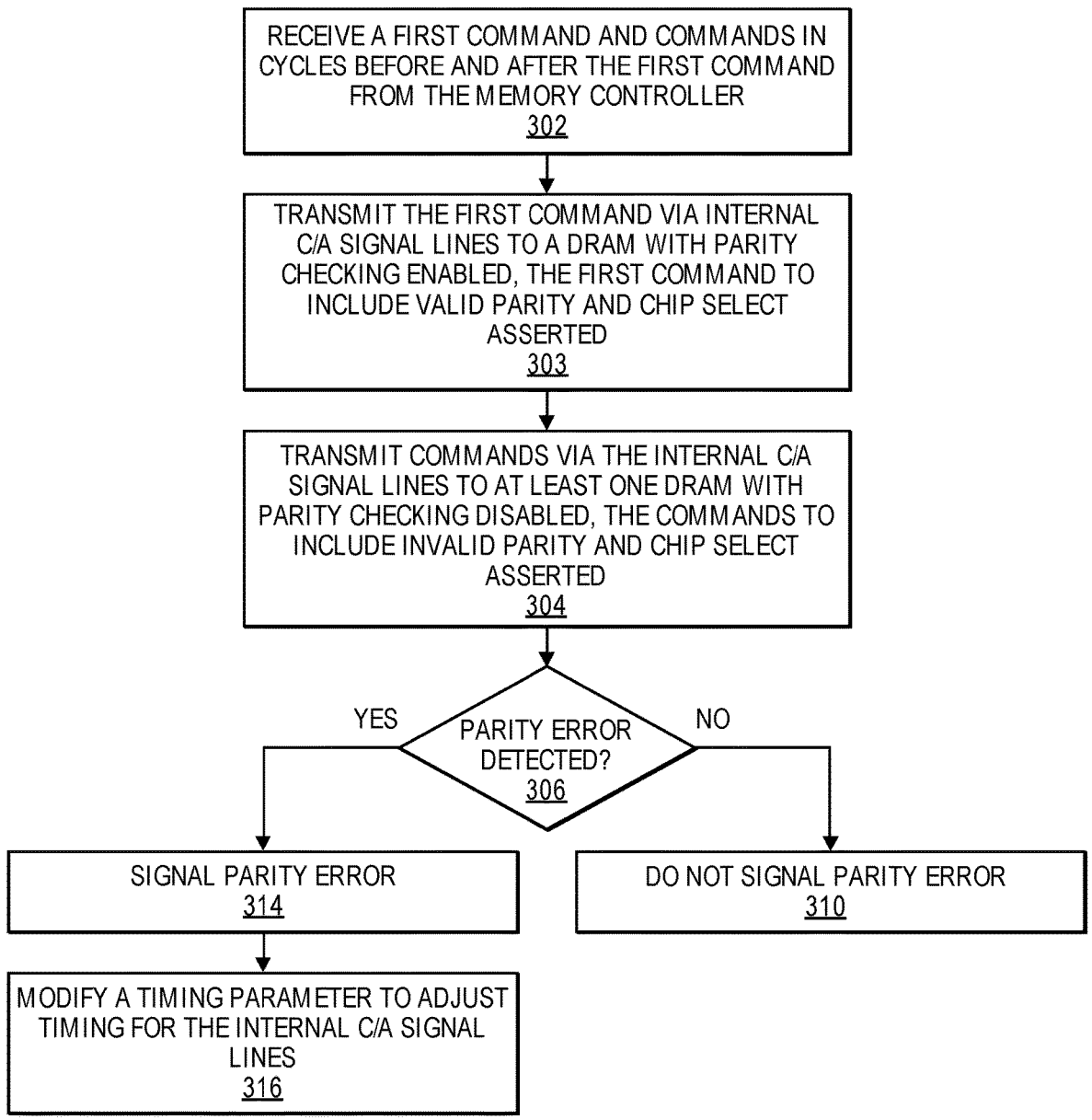
FIG. 3 is a flow diagram illustrating an example of a method performed by a memory device to train a command/address (C/A) bus.

FIG. 3 is a flow diagram illustrating the exemplary method described in FIG. 2, but from the perspective of the memory module. For example, the method 300 of FIG. 3 can be performed by elements of the DIMM 120 of FIG. 1.

Referring to block 302, the register (e.g., the register 130 of FIG. 1) receives a first command and commands in cycles before and after the first command from the memory controller. The first command has valid parity and is targeting a DRAM with parity enabled. The commands before and after the first command have invalid parity and are targeting one or more DRAM with parity disabled. The register then transmits the commands to the DRAMs at blocks 303 and 304. The memory module detects whether a parity error has occurred (e.g., if the DRAM with parity enabled has signaled a parity error by driving a value on the ALERT signal line). If the memory module detects a parity error (306 YES branch), the memory module signals the parity error, at block 214. The memory module can communicate the parity error to the memory controller by updating a register (e.g., one or more mode registers 137) or by some other mechanism to signal a parity error, at block 314. The memory module than modifies a timing parameter to adjust timing for the internal C/A signal lines, at block 316. As mentioned above, delays can be added to the internal C/A signal lines, the internal CS signal lines, or the internal clock (CK) signal lines. The memory module can modify timing in response to a command from the memory controller, or due to internal timing controls. If the memory module does not detect a parity error (306 NO branch), the memory module does not signal a parity error, at block 310, and continue operating without modifying timing parameters.

FIGS. 4A-4B include charts illustrating examples of command/address (C/A) bus training patterns. The charts in FIGS. 4A and 4B are nonlimiting examples of commands and training patterns; other commands and training patterns may be used.

In one example, the BIOS or device drivers initiate C/A bus training by causing the memory controller to transmit a series of commands, such as commands shown in FIGS. 4A and 4B. In one example, the memory controller includes logic referred to as a command address data buffer (CADB) (not specifically shown in FIG. 1), which enables the host to control the state of the command signals at each cycle. In one such example, the BIOS can directly configure the CADB of the memory controller with the desired series of commands for training, and then trigger the transmission of those commands to memory (such as by writing to a register). The BIOS or driver can then determine once the commands have been transmitted (such as by polling a register), and then adjust timing parameters if appropriate.

Referring again to FIG. 4A, tables 402 and 404 illustrate an example of training patterns to train the parity (PAR) signal line. In the illustrated example, all three commands are no operation commands (NOP) for training the parity signal line, however, other commands with CS asserted can be used. There are two sequences of commands—the table 402 shows a first sequence of commands in which the parity bit transitions from low to high to low (e.g., from logic 0 to logic 1 to logic 0), and the table 404 shows a second sequence of commands in which the parity bit transitions from high to low to high (e.g., logic 1 to logic 0 to logic 1). Thus, the training patterns illustrated in tables 402 and 404 create transitions from low to high and from high to low to enable more reliable detection of errors. In addition to creating transitions on the signal being trained (which, in tables 402 and 404, is the parity signal), there are also transitions on the CS signal lines. The "Target CS_N" column of tables 402 and 404 shows the value asserted on the CS signal line for the DRAM with parity enabled. The "Non-Target CS" column shows the value asserted on the CS signal line for the DRAM(s) with parity disabled. Thus, the commands in the first and third rows are tables 402 and 404 are to "non-target" DRAMs (e.g., to a DRAM with parity checking disabled), and the command in the second row of tables 402 and 404 are to a "target" DRAM (with parity checking enabled). In the illustrated example, the other C/A signal lines are held constant at either 1 or 0, but other patterns may be used.

Table 406 shows a sequence of commands to train the activate (ACT_N) signal line. In the illustrated example, the activate (ACT) command is used for the command with valid parity, and NOP commands are used for the commands with invalid parity before and after the ACT command. However, other commands with CS asserted and patterns may be used. Note that the example illustrated in table 406 tests a transition from high to low to high, but that another pattern to test the transition from low to high to low is not illustrated. This example is a possible testing pattern for an implementation in which the number of clock cycles between ACT assertions is limited. For example, in JEDEC (Joint Electronic Device Engineering Council) DDR4 (DDR version 4, initial specification published in September 2012 by JEDEC, whenever an ACT command is sent, a precharge command (e.g., PREA) is sent to return the DRAM to the idle state. In one such example, a PREA will assert precharge in all bank groups. Thus, in the example illustrated in table 406, the transactions shown in table 406 are followed by a PREA command (not shown in the table). Other patterns may also be used.

Referring to FIG. 4B, tables 408 and 410 illustrate an example of training patterns to train address signal lines. In the illustrated example, there is a sequence of commands to cause the address signal being margined to transition from low to high to low (as seen in table 408) and a sequence of commands to cause the address signal being margined to transition from high to low to high (as seen in table 410). The commands illustrated in tables 408 and 410 are NOP commands, however, other commands with CS asserted can be used. In the illustrated example, the other address signals that are not being margined are a logic 0. Like the examples in FIG. 4A, the commands in the first and third rows are tables 408 and 410 are to "non-target" DRAMs (e.g., to a DRAM with parity checking disabled), and the command in the second row of tables 408 and 410 are to a "target" DRAM (with parity checking enabled). The remaining signals in the example shown in tables 408 and 410 are logic 1. However, other signal patterns could also be used.

In one example, a method of training the C/A bus involves transmitting commands (e.g., a sequence of commands) twice for each signal of the C/A bus. For example, training can involves transmitting all the commands illustrated in FIGS. 4A and 4B. Thus, training the C/A bus can involve, for each C/A signal line: transmitting a sequence of commands twice, once with a transition of low-high-low on the C/A signal line, and a second time with a transition of high-low-high on the C/A signal line. In one such example, the C/A signals includes: a parity signal (PAR), an activate signal (ACT), address signals (A[17:0], C[2:0], BG[1:0], BA[1:0]), row address strobe (RAS), column address strobe (CAS), and a write enable signal (WE). Other implementations may include additional, fewer, or different C/A signal lines.

FIGS. 5A-5F are timing diagrams illustrating examples of commands that can be used for command/address bus training. The timing diagrams of FIGS. 5A-5F illustrate selected timing elements, and is not necessarily a complete representation of all signals or operations that occur. Furthermore, the illustrated blocks do not necessarily convey scale or amount of time. Rather, the diagram illustrates relative order of operations in accordance with some examples.

Figure 5A:
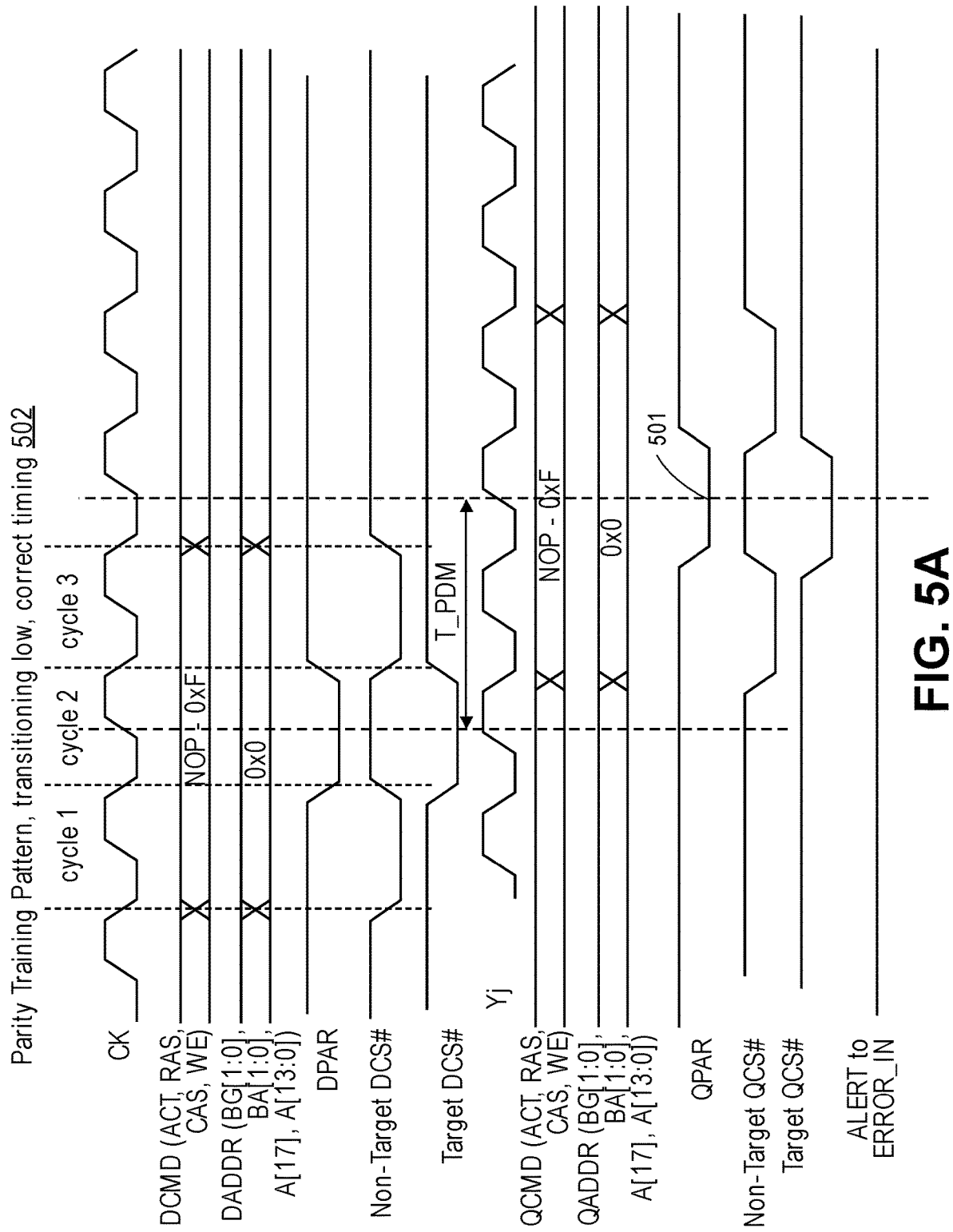
FIGS. 5A-5F are timing diagrams illustrating examples of command/address (C/A) bus training.
Figure 5B:
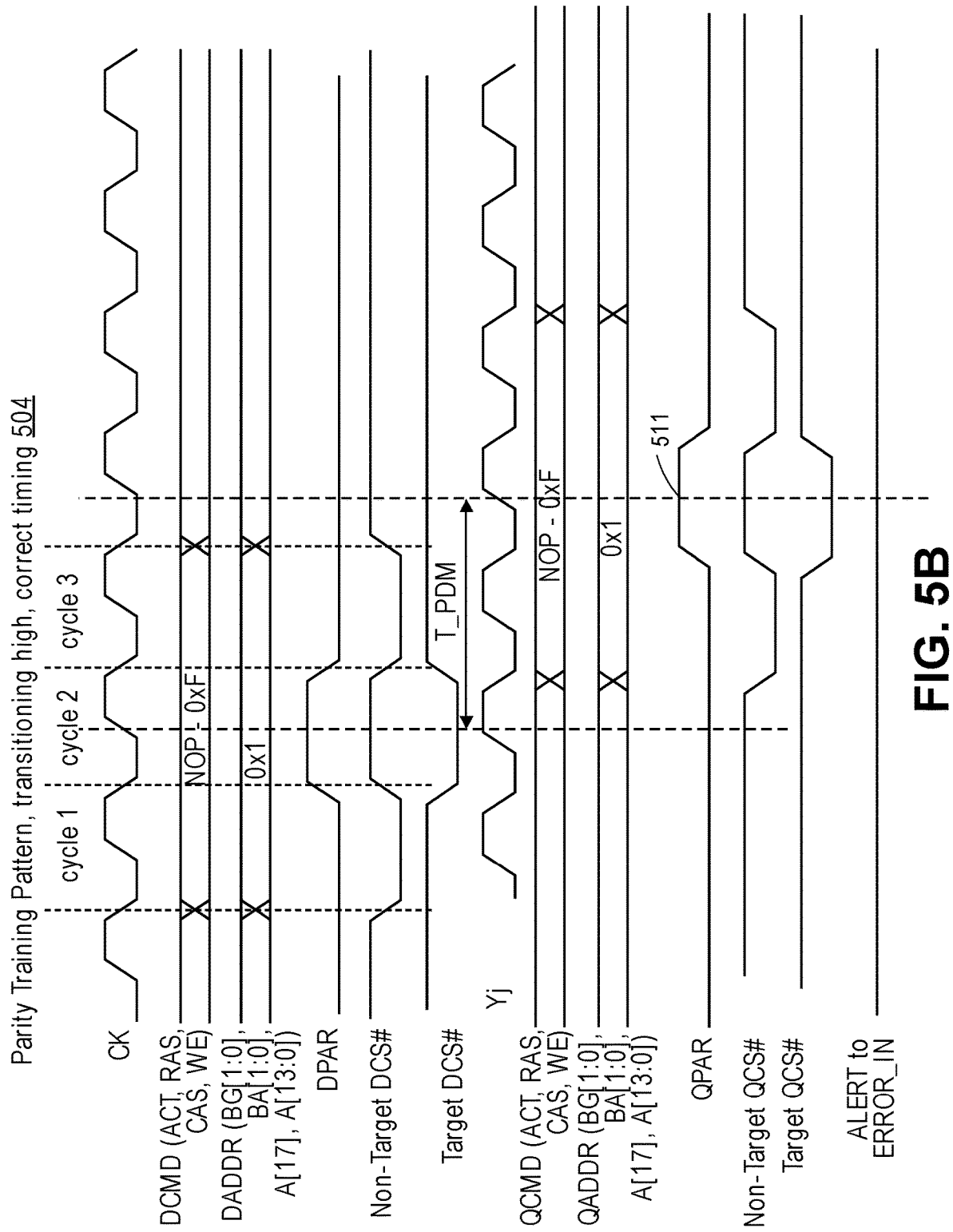
Figure 5C:
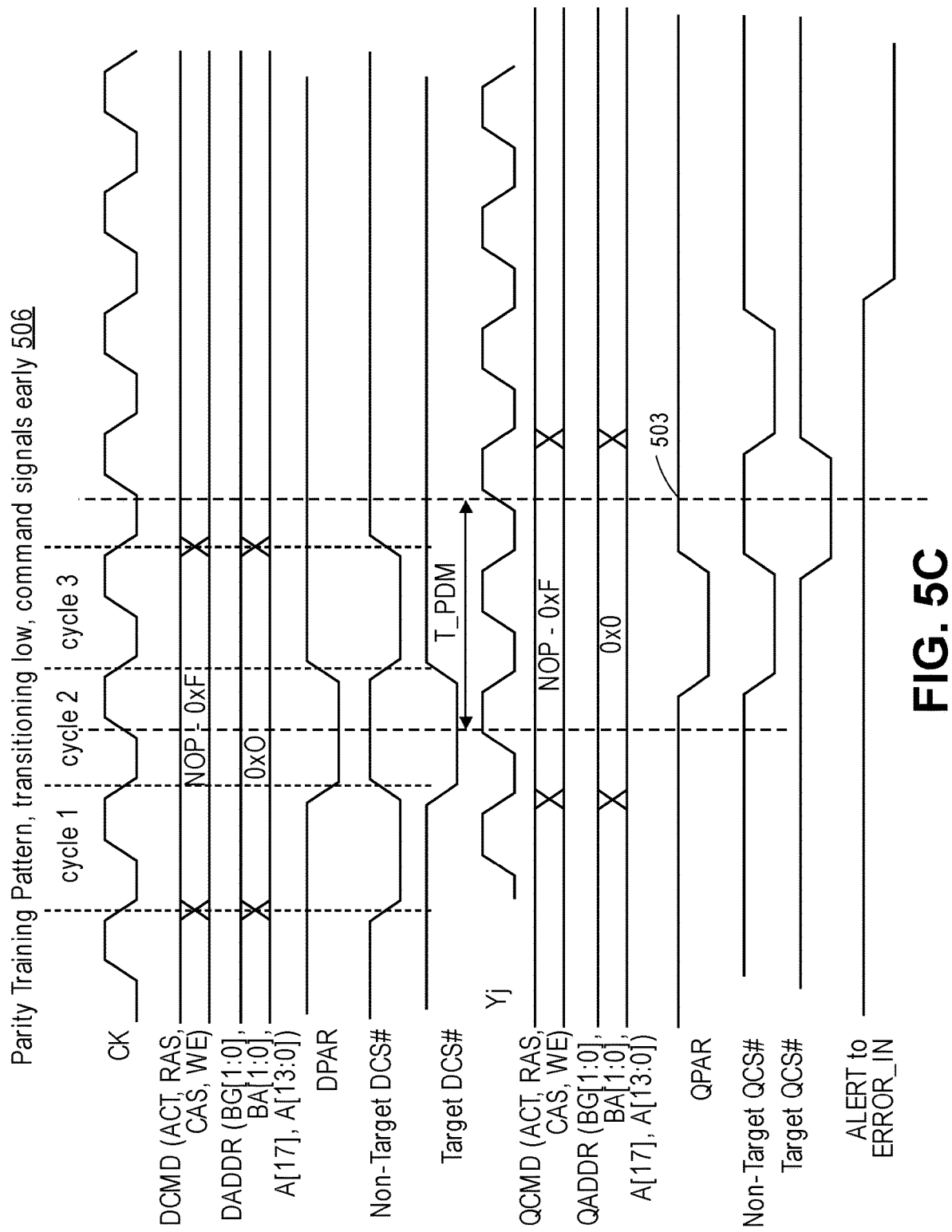
Figure 5D:
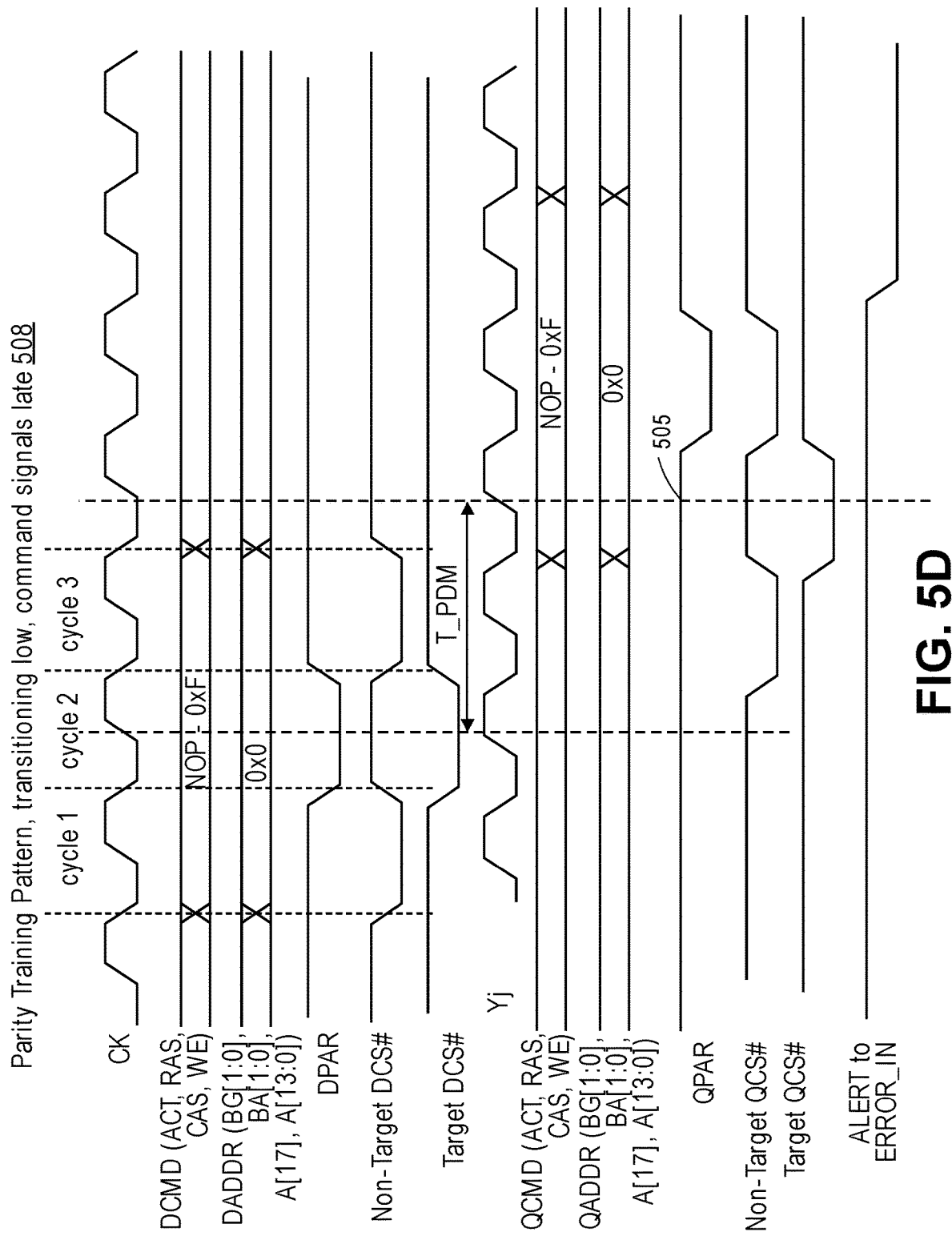
Figure 5E:
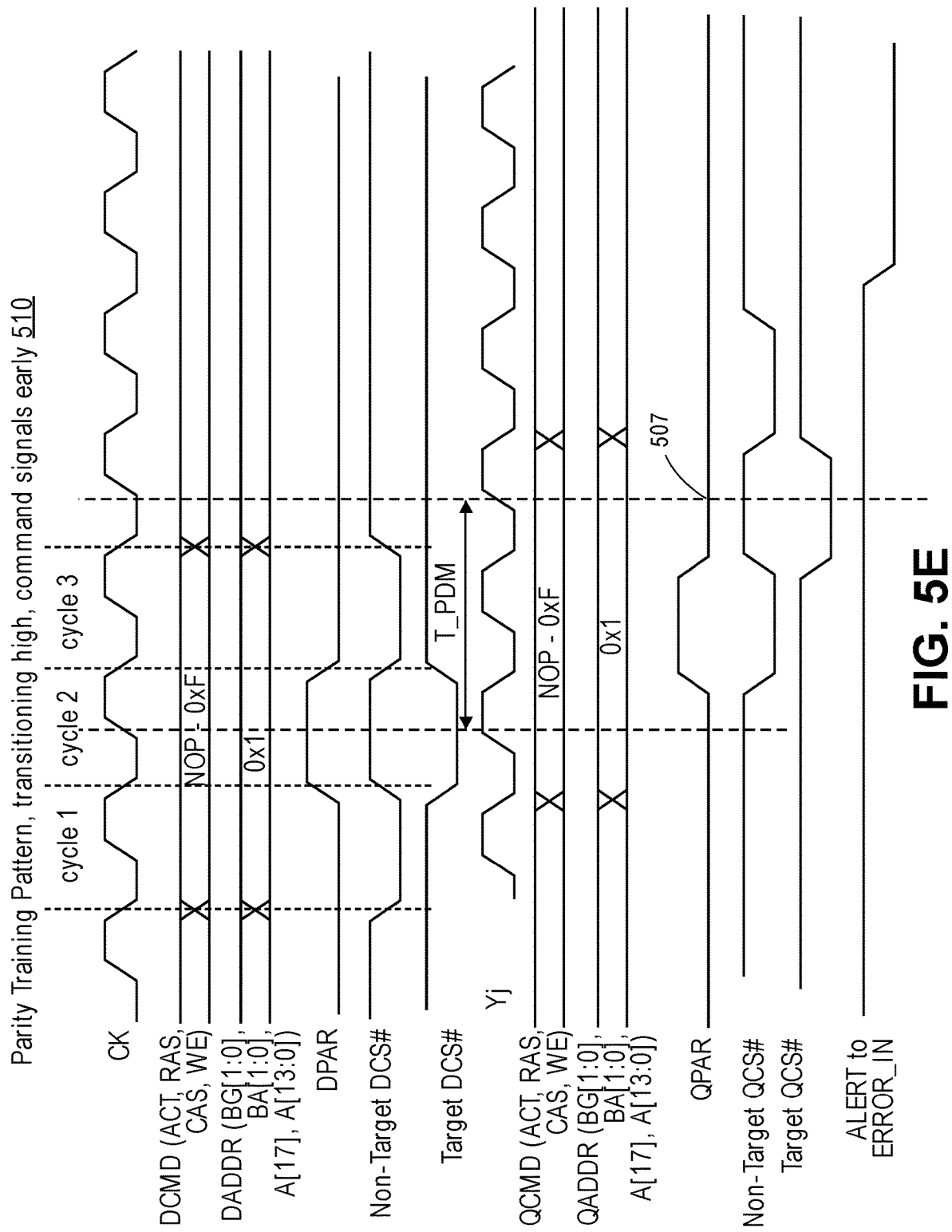
Figure 5F:
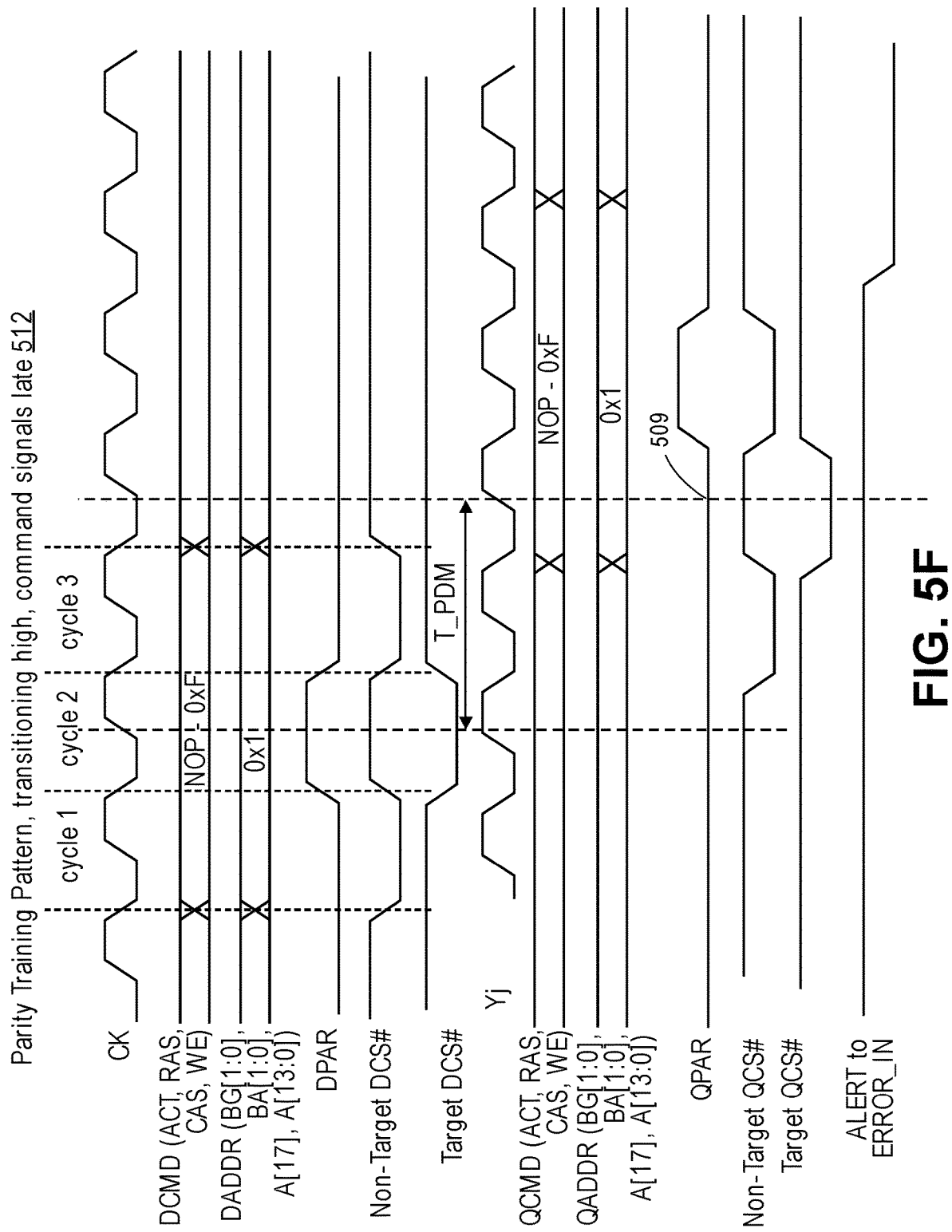

FIGS. 5A and 5B are timing diagrams showing examples in which the timing is correct (e.g., timing is within the internal CA passing "eye"). FIGS. 5C-5F are timing diagrams showing examples where the command and address signals on the backside C/A bus are incorrect (e.g., either early or late relative to the CS signals) (e.g., timing is outside the internal CA passing "eye"). FIGS. 5D and 5F show examples of a command setup time violation (tIS) at the input to the target DRAM rank. FIGS. 5C and 5E show examples of a command hold time violation (tIH) at the input to the target DRAM rank.

Referring to FIG. 5A, the timing diagram 502 illustrates an example of parity signal margining in which the parity signal transitions from high to low to high. The signal names starting with a 'D' are signals between the memory controller and the register of the memory module (e.g., between the host 110 and the register 130 of FIG. 1). The signals starting with a 'Q' are between the register of the memory module and the DRAMs (e.g., between the register 130 and DRAMs 122 of FIG. 1). Thus, the 'D' signals for command and address (e.g., DCMD and DADDR, DPAR) can be referred to as frontside C/A bus signals, and 'Q' signals for command and address (e.g., QCMD, QADDR, QPAR) can be referred to as backside C/A bus signals. Similarly, CK is a clock signal between the memory controller and the register of the memory module, and DCS# (for both the "target" and "non-target" DRAMs) are chip select signals between the memory controller and the register of the memory module. Yj is a clock signal between the register of the memory module and the DRAMs, and QCS# are the chip select signals between the register and the DRAMs. ALERT is a signal internal to the memory module. In one example, the ALERT signal is coupled with all the DRAM devices of the memory module, as illustrated with the ALERT signal 145 of FIG. 1. For example, output from all the DRAM devices can be OR'ed together, so that an error (such as a parity error) that occurs on any DRAM device is asserted on the ALERT signal back to the register. The ALERT signal from the DRAMs can be connected to the ERROR_IN pin of the register. The register can then signal the error to the memory controller (e.g., via the ALERT signal from the register, which is connected to the CPU's ALERT signal). The parity error can also be logged in a register (e.g., mode register, multi-purpose register, or other type of register). Thus, the memory controller can determine a parity error has occurred by detecting the assertion of the ALERT signal from the register. In some implementations, the memory controller can then read the appropriate mode register (e.g., via a register read command (MRR)) to determine information about the parity error.

As mentioned briefly above, the timing diagram 502 an example of parity signal margining in which the parity signal DPAR transitions from high to low to high. In the example illustrated in timing diagram 502, the memory controller sends three NOP commands over the command signal lines (DCMD) over cycles 1-3. Similar to the training patterns in table 404 of FIG. 4, the values driven on the DCMD (e.g., ACT, RAS, CAS, and WE) and DADDR (BG, BA, and A) signal lines are held at the same value for three cycles, while the CS and parity bits toggle. In cycle 1 DPAR is high, in cycle 2 DPAR is low, and in cycle 3 DPAR is high. Thus, there is a transition of high to low to high on the parity signal line. The memory controller causes the transition on the frontside parity signal line DPAR, which in turn causes the register to cause a transition on the backside parity signal line QPAR. There are also transitions on the CS signal lines. In the illustrated example, in cycle 1 DCS# for the non-target DRAM or rank is low (asserted) and DCS# for the target DRAM or rank is high (not asserted). In cycle 2 DCS# for the non-target DRAM or rank is high (not asserted) and DCS# for the target rank is low (asserted). In cycle 3 DCS# for the non-target DRAM or rank is low (asserted) and DCS# for the target DRAM or rank is high (not asserted). Thus, the target DRAM or rank is selected in cycle 2, and one or more non-target DRAMs or rank is selected in cycles 1 and 3. Note that the DRAMs selected in cycle 1 and in cycle 3 can be the same or a different DRAM with parity checking disabled.

The signals CK, DCMD, DADDR, DPAR, and DCS# are received by the register of the memory module, buffered, and sent to the appropriate DRAMs via the signals Yj, QCMD, QADDR, QPAR, and QCS#. There is a delay between the signals sent by the memory controller and the signals sent by the register of the memory module, as shown by the time T_PDM (propagation delay). In the example illustrated in timing diagram 502, the timing is correct so that when QPAR is low, QCS# for the target DRAM or rank is low (asserted) (as shown by reference number 501), and when QPAR is high, QCS# for the non-target DRAM or rank is low (asserted). Therefore, the DRAMs will not signal a parity error because the non-target DRAMs have parity checking disabled and the target DRAM receives correct parity over the parity signal line. Accordingly, the ALERT signal is not asserted (e.g., in the illustrated example the ALERT signal remains high).

Referring to FIG. 5B, the timing diagram 504 also illustrates an example of a parity signal margining. Timing diagram 504 of FIG. 5B is similar to timing diagram 502 of FIG. 5A except that the parity signal DPAR transitions from low to high to low (e.g. due to the parity calculation being different due to different values driven on the DADDR signal lines). Also, similar to FIG. 5A, the timing diagram illustrates correct timing, so that the parity signal is correct when CS# for the target DRAM is asserted (at 511).

Referring to FIG. 5C, the timing diagram 506 illustrates an example of parity signal margining in which the parity signal DPAR transitions from high to low to high. The timing diagram 506 of FIG. 5C is similar to the timing diagram 502 of FIG. 5A except that the timing is incorrect on the backside C/A signals in FIG. 5C. Specifically, the signals QCMD, QADDR, and QPAR (referred to as command signals in FIG. 5C for abbreviation) are early relative to the chip select signals QCS# for both the target and non-target DRAMs or ranks. Therefore, the DRAM with parity enabled (referred to as the target DRAM) samples the parity signal QPAR at the incorrect time, and determines that there is a parity error (see, e.g., incorrect parity sampled late for target DRAM, as shown by reference number 503). The target DRAM therefore asserts the ALERT signal in response to detection of the parity error. The memory controller can then determine that there is a timing problem and adjust the timing of one or more signals on the memory side, as discussed above.

Referring to FIG. 5D, the timing diagram 508 illustrates an example of parity signal margining in which the parity signal DPAR transitions from high to low to high. The timing diagram 508 of FIG. 5D is similar to the timing diagram 502 of FIG. 5A except that the timing is incorrect on the backside C/A signals in FIG. 5D. Specifically, the signals QCMD, QADDR, and QPAR (referred to as command signals in FIG. 5D for abbreviation) are late relative to the chip select signals QCS# for both the target and non-target DRAMs or ranks. Therefore, the DRAM with parity enabled (referred to as the target DRAM) samples the parity signal QPAR at the incorrect time, and determines that there is a parity error (see, e.g., incorrect parity sampled early for target DRAM, as shown by reference number 505). The target DRAM therefore asserts the ALERT signal in response to detection of the parity error. The memory controller can then determine that there is a timing problem and adjust the timing of one or more signals on the memory side, as discussed above.

Referring to FIG. 5E, the timing diagram 510 illustrates an example of parity signal margining in which the parity signal DPAR transitions from low to high to low. The timing diagram 510 of FIG. 5E is similar to the timing diagram 504 of FIG. 5A except that the timing is incorrect on the backside C/A signals in FIG. 5E. Specifically, the signals QCMD, QADDR, and QPAR (referred to as command signals in FIG. 5E for abbreviation) are early relative to the chip select signals QCS# for both the target and non-target DRAMs or ranks. Therefore, the DRAM with parity enabled (referred to as the target DRAM) samples the parity signal QPAR at the incorrect time, and determines that there is a parity error (see, e.g., incorrect parity sampled late for target DRAM, as shown by reference number 507). The target DRAM therefore asserts the ALERT signal in response to detection of the parity error. The memory controller can then determine that there is a timing problem and adjust the timing of one or more signals on the memory side, as discussed above.

Referring to FIG. 5F, the timing diagram 512 illustrates an example of parity signal margining in which the parity signal DPAR transitions from high to low. The timing diagram 512 of FIG. 5F is similar to the timing diagram 504 of FIG. 5B except that the timing is incorrect on the backside C/A signals in FIG. 5F. Specifically, the signals QCMD, QADDR, and QPAR (referred to as command signals in FIG. 5E for abbreviation) are late relative to the chip select signals QCS# for both the target and non-target DRAMs or ranks. Therefore, the DRAM with parity enabled (referred to as the target DRAM) samples the parity signal QPAR at the incorrect time, and determines that there is a parity error (see, e.g., incorrect parity sampled early for target DRAM, as shown by reference number 509). The target DRAM therefore asserts the ALERT signal in response to detection of the parity error. The memory controller can then determine that there is a timing problem and adjust the timing of one or more signals on the memory side, as discussed above.

By progressively changing the timing relationship of QCA relative to Yj and QCS#, an application of this invention is able to determine the functional QCA setup margin and hold margin in system. The QCA setup margin is given by transition from correct timing (such as shown in FIGS. 5A and 5B) to a command setup time violation (such as shown in FIGS. 5D and 5F). The QCA hold margin is given by transition from correct timing to a command hold time violation (such as shown in FIGS. 5C and 5E). As mentioned above, after collecting the CA margins for each target rank, the worst case combined margins can be determined. In one example, using the worst case setup and hold margins, an ideal CA timing can be programmed in the register (e.g., RCD) for normal operation. If the available CA margins are too low for reliable operation, then the DIMM could be eliminated from the system memory map.

Thus, the examples illustrated in FIGS. 5A-5F enable margining the parity signal on the backside between the register of the memory module and the DRAMs, unlike some conventional techniques. Although the examples in FIGS. 5A-5F specifically show margining of the parity signal, similar techniques can be used for any C/A signal. For example, patterns such as those illustrated in FIGS. 4A and 4B can be applied to the C/A bus to train all the backside C/A signals. Also note that although some signals are illustrated as active-high or active-low signals, different conventions can be used. For example, ALERT and CS# are illustrated as active-low signals, however, one or both of these signals can be active-high so that the signals are asserted when high.

Figure 6:
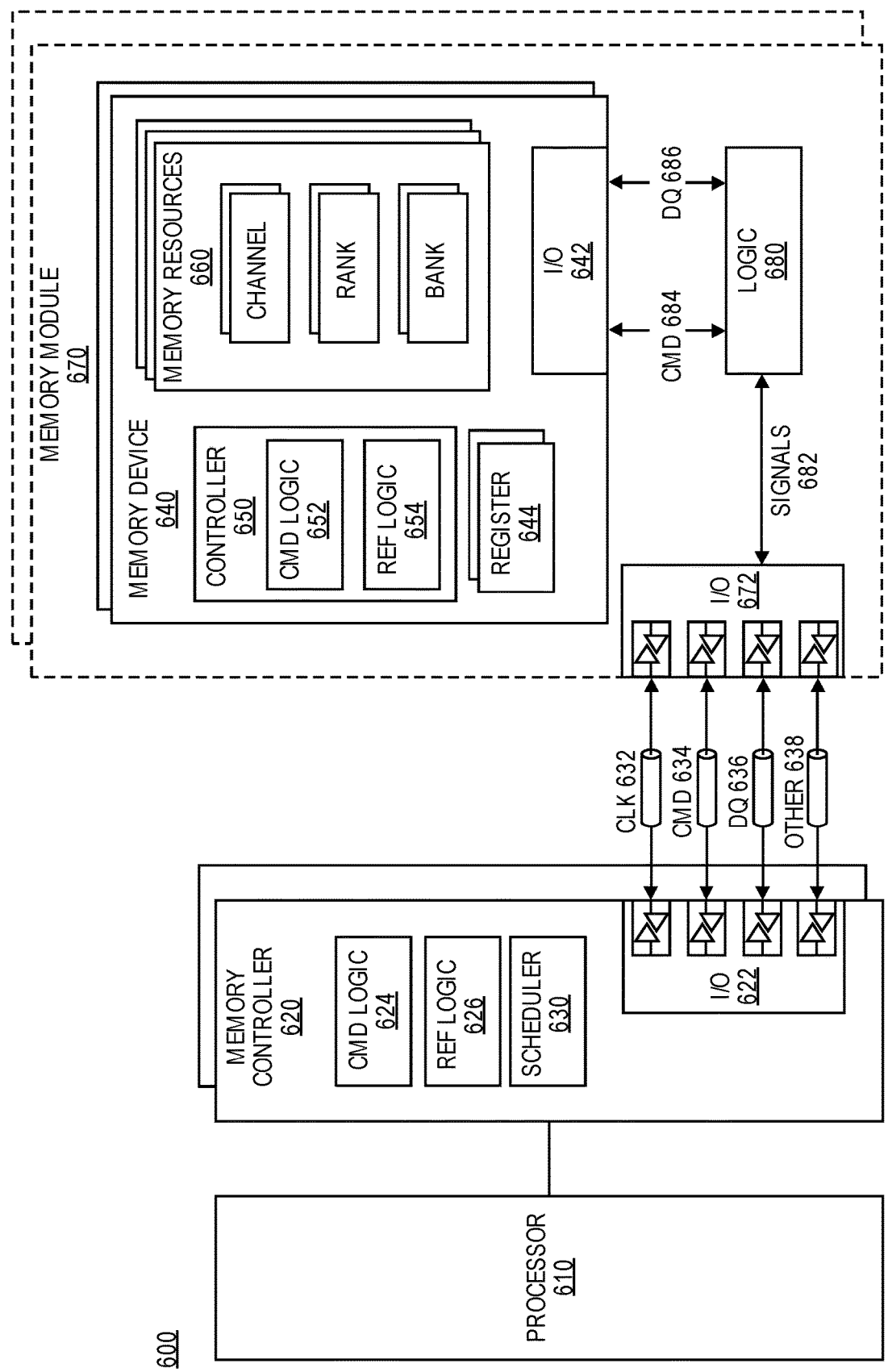
FIG. 6 is a block diagram of an example of a system with a memory device and memory controller in which command/address (C/A) bus training can be implemented.
Figure 7:
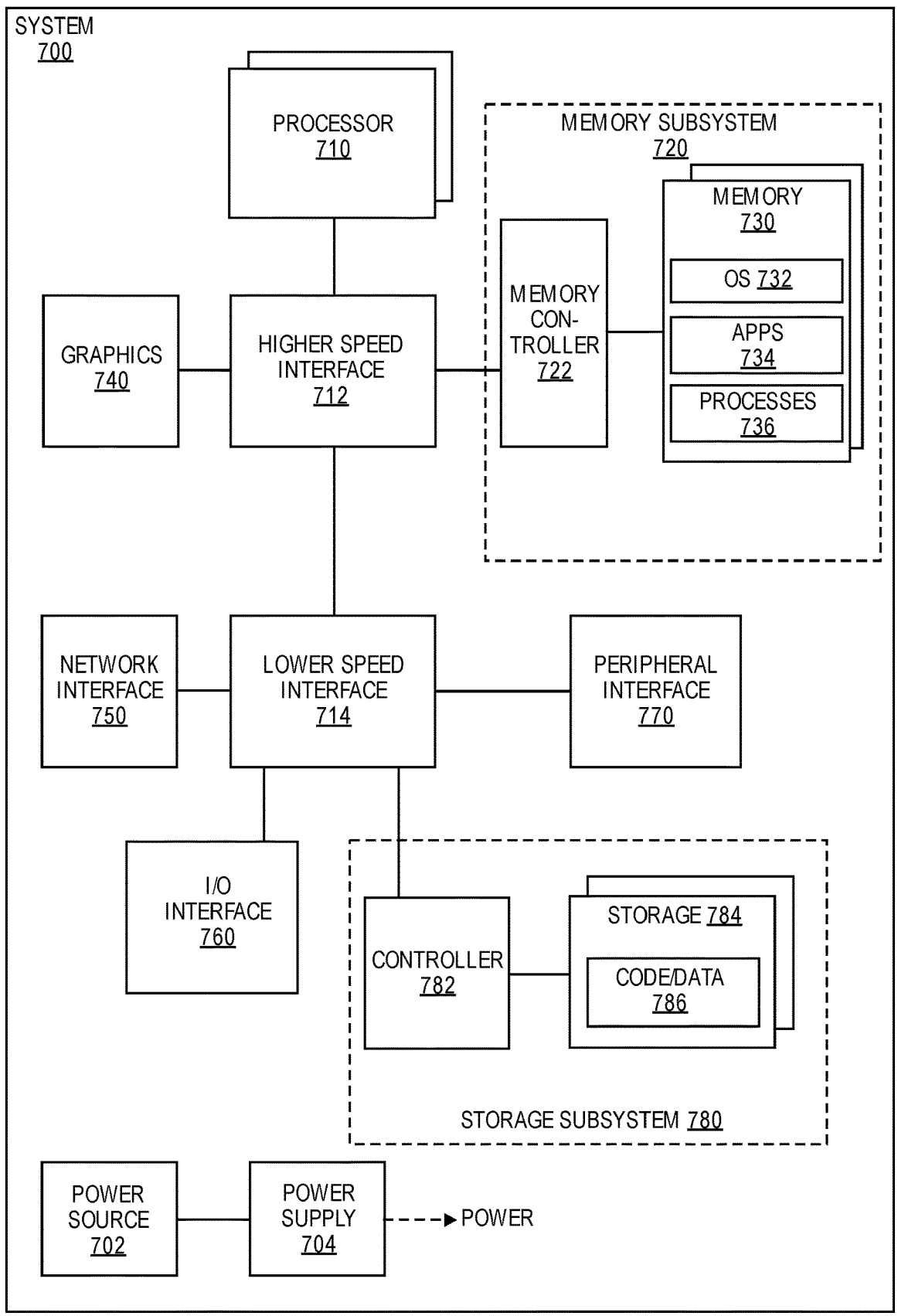
FIG. 7 is a block diagram of an example of a computing system in which command/address (C/A) bus training can be implemented.
Figure 8:
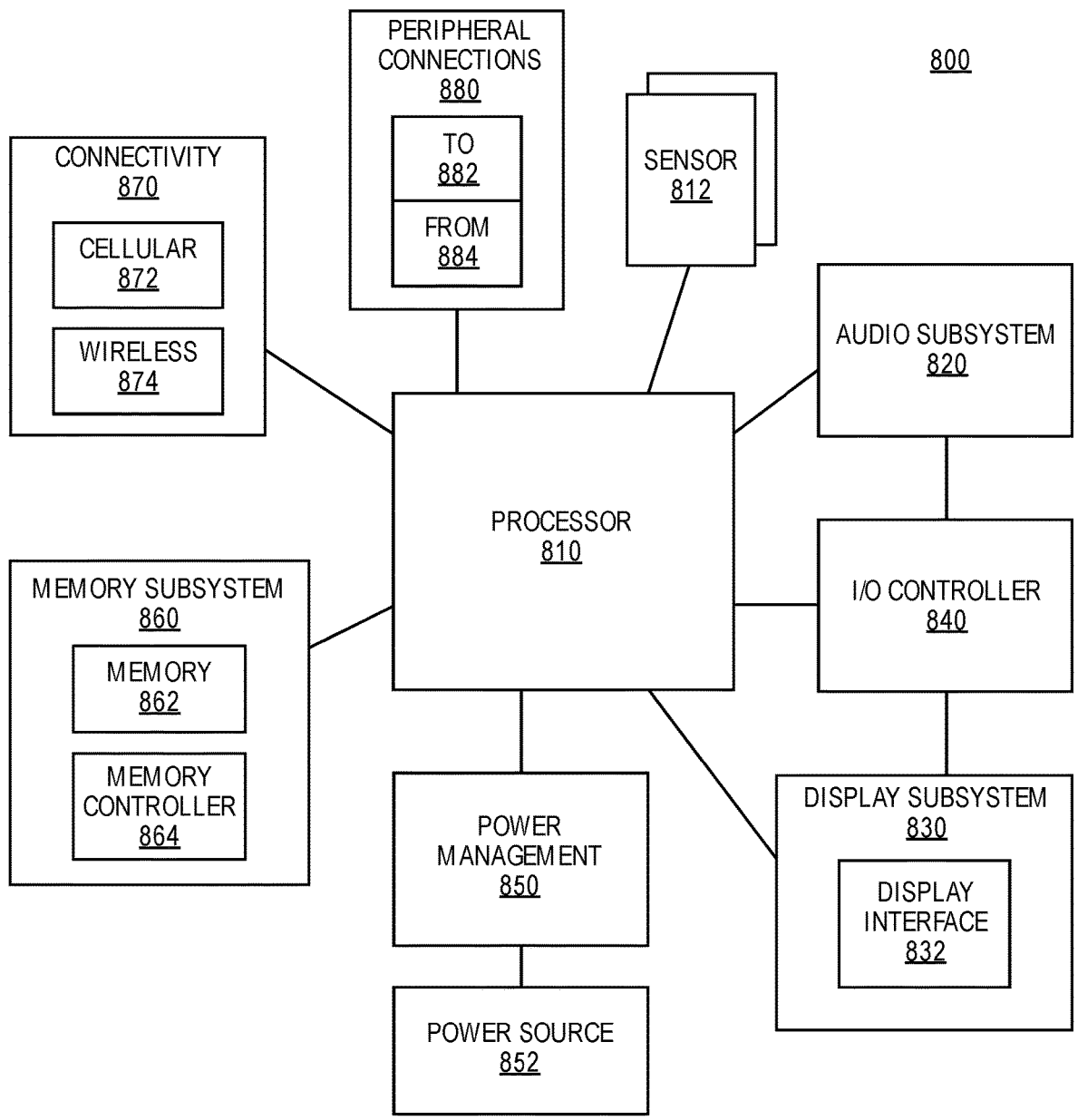
FIG. 8 is a block diagram of an example of a mobile device in which command/address (C/A) bus training can be implemented.

FIGS. 6-8 illustrate examples of systems in which C/A bus training techniques can be implemented in accordance with examples described in the present disclosure.

FIG. 6 is a block diagram of an example of a system with a memory controller and memory module in which C/A bus training techniques can be implemented. System 600 includes a processor and elements of a memory subsystem in a computing device. Processor 610 represents a processing unit of a computing platform that may execute an operating system (OS) and applications, which can collectively be referred to as the host or user of the memory. The OS and applications execute operations that result in memory accesses. Processor 610 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. The processor 610, the memory controller 620, or both, can be the same or similar to the host 110 of FIG. 1 described above. Memory accesses may also be initiated by devices such as a network controller or hard disk controller. Such devices can be integrated with the processor in some systems or attached to the processor via a bus (e.g., PCI express), or a combination. System 600 can be implemented as an SOC (system on a chip), or be implemented with standalone components.

Memory controller 620 represents one or more memory controller circuits or devices for system 600. The memory controller can be the same or similar to the memory controller 113 of FIG. 1. Memory controller 620 represents control logic that generates memory access commands in response to the execution of operations by processor 610. Memory controller 620 accesses one or more memory devices 640.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes. DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, reference to memory devices can refer to a nonvolatile memory device whose state is determinate even if power is interrupted to the device. In one example, the nonvolatile memory device is a block addressable memory device, such as NAND or NOR technologies. Thus, a memory device can also include a future generation nonvolatile device, such as a three-dimensional crosspoint (e.g., 3DXP) memory device, other byte addressable nonvolatile memory devices, or memory devices that use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one example, a system with volatile memory that needs to be refreshed can also include nonvolatile memory.

In one example, memory devices 640 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. As used herein, coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 620 manages a separate memory channel, although system 600 can be configured to have multiple channels managed by a single controller, or to have multiple controllers on a single channel. In one example, memory controller 620 is part of host processor 610, such as logic implemented on the same die or implemented in the same package space as the processor.

Memory controller 620 includes I/O interface logic 622 to couple to a memory bus, such as a memory channel as referred to above. I/O interface logic 622 (as well as I/O interface logic 642 of memory device 640) can include pins, pads, connectors, signal lines, traces, or wires, or other hardware to connect the devices, or a combination of these. I/O interface logic 622 can include a hardware interface. As illustrated, I/O interface logic 622 includes at least drivers/transceivers for signal lines. Commonly, wires within an integrated circuit interface couple with a pad, pin, or connector to interface signal lines or traces on the other wires between devices. I/O interface logic 622 can include drivers, receivers, transceivers, or termination, or other circuitry or combinations of circuitry to exchange signals on the signal lines between the devices. The exchange of signals includes at least one of transmit or receive. While shown as coupling I/O 622 from memory controller 620 to I/O 642 of memory device 640, it will be understood that in an implementation of system 600 where groups of memory devices 640 are accessed in parallel, multiple memory devices can include I/O interfaces to the same interface of memory controller 620. In an implementation of system 600 including one or more memory modules 670, I/O 642 can include interface hardware of the memory module in addition to interface hardware on the memory device itself. Other memory controllers 620 will include separate interfaces to other memory devices 640.

The bus between memory controller 620 and memory devices 640 can be implemented as multiple signal lines coupling memory controller 620 to memory devices 640. The bus may typically include at least clock (CLK) 632, command/address (C/A or CMD) 634, and write data (DQ) and read DQ 636, and zero or more other signal lines 638. In one example, a bus or connection between memory controller 620 and memory can be referred to as a memory bus. The signal lines for write and read DQ can be referred to as a "data bus." In one example, independent channels have different clock signals, C/A buses, data buses, and other signal lines. Thus, system 600 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 620 and memory devices 640. An example of a serial bus technology is 8B10B encoding and transmission of high-speed data with embedded clock over a single differential pair of signals in each direction.

In one example, one or more of CLK 632, C/A 634, DQ 636, or other 638 can be routed to memory devices 640 through logic 680. Logic 680 can be or include a register or buffer circuit, such as the register 130 of FIG. 1. Logic 680 can reduce the loading on the interface to I/O 622, which allows faster signaling or reduced errors or both. The reduced loading can be because I/O 622 sees only the termination of one or more signals at logic 680, instead of termination of the signal lines at every one or memory devices 640 in parallel. While I/O interface 642 is not specifically illustrated to include drivers or transceivers, it will be understood that I/O interface 642 includes hardware necessary to couple to the signal lines. Additionally, for purposes of simplicity in illustrations, I/O interface 642 does not illustrate all signals corresponding to what is shown with respect to I/O interface 622. In one example, all signals of I/O interface 622 have counterparts at I/O interface 642. Some or all of the signal lines interfacing I/O interface 642 can be provided from logic 680. In one example, certain signals from I/O interface 622 do not directly couple to I/O interface 642, but couple through logic 680, while one or more other signals may directly couple to I/O interface 642 from I/O interface 622 via I/O interface 672, but without be buffered through logic 680. Signals 682 represent the signals that interface with memory devices 640 through logic 680 via signal lines 684 (internal C/A signal lines) and signal lines 686 (internal DO signal lines).

In accordance with the chosen memory technology and system design, other signals 638 may accompany a bus, such as strobe lines DQS. Based on design of system 600, or implementation if a design supports multiple implementations, the data bus can have more or less bandwidth per memory device 640. For example, the data bus can support memory devices that have either a x32 interface, a x16 interface, a x8 interface, or other interface. The convention "xW," where W is an integer that refers to an interface size or width of the interface of memory device 640, which represents a number of signal lines to exchange data with memory controller 620. The number is often binary, but is not so limited. The interface size of the memory devices is a controlling factor on how many memory devices can be used concurrently per channel in system 600 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

Memory devices 640 represent memory resources for system 600. In one example, each memory device 640 is a separate memory die. In one example, each memory device 640 can interface with multiple (e.g., 2) channels per device or die. Each memory device 640 includes I/O interface logic 642, which has a bandwidth determined by the implementation of the device (e.g., x16 or x8 or some other interface bandwidth). I/O interface logic 642 enables the memory devices to interface with memory controller 620. I/O interface logic 642 can include a hardware interface, and can be in accordance with I/O 622 of memory controller, but at the memory device end. In one example, multiple memory devices 640 are connected in parallel to the same command and data buses. In another example, multiple memory devices 640 are connected in parallel to the same command bus, and are connected to different data buses. For example, system 600 can be configured with multiple memory devices 640 coupled in parallel, with each memory device responding to a command, and accessing memory resources 660 internal to each.

In one example, memory devices 640 are disposed directly on a motherboard or host system platform (e.g., a PCB (printed circuit board) on which processor 610 is disposed) of a computing device. In one example, memory devices 640 can be organized into memory modules 670. In one example, memory modules 670 represent dual inline memory modules (DIMMs). In one example, memory modules 670 represent other organization of multiple memory devices to share at least a portion of access or control circuitry, which can be a separate circuit, a separate device, or a separate board from the host system platform. Memory modules 670 can include multiple memory devices 640, and the memory modules can include support for multiple separate channels to the included memory devices disposed on them. In another example, memory devices 640 may be incorporated into the same package as memory controller 620, such as by techniques such as multi-chip-module (MCM), package-on-package, through-silicon VIA (TSV), or other techniques or combinations. Similarly, in one example, multiple memory devices 640 may be incorporated into memory modules 670, which themselves may be incorporated into the same package as memory controller 620. It will be appreciated that for these and other examples, memory controller 620 may be part of host processor 610.

Memory devices 640 each include memory resources 660. Memory resources 660 represent individual arrays of memory locations or storage locations for data. Typically, memory resources 660 are managed as rows of data, accessed via wordline (rows) and bitline (individual bits within a row) control. Memory resources 660 can be organized as separate channels, ranks, and banks of memory. Channels may refer to independent control paths to storage locations within memory devices 640. Ranks may refer to common locations across multiple memory devices (e.g., same row addresses within different devices). Banks may refer to arrays of memory locations within a memory device 640. In one example, banks of memory are divided into sub-banks with at least a portion of shared circuitry (e.g., drivers, signal lines, control logic) for the sub-banks. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 640 include one or more registers 644. Register 644 represents one or more storage devices or storage locations that provide configuration or settings for the operation of the memory device. In one example, register 644 can provide a storage location for memory device 640 to store data for access by memory controller 620 as part of a control or management operation. In one example, register 644 includes one or more Mode Registers. In one example, register 644 includes one or more multipurpose registers. The configuration of locations within register 644 can configure memory device 640 to operate in different "mode," where command information can trigger different operations within memory device 640 based on the mode. Additionally or in the alternative, different modes can also trigger different operation from address information or other signal lines depending on the mode. Settings of register 644 can indicate configuration for I/O settings (e.g., timing, termination or ODT (on-die termination), driver configuration, or other I/O settings).

In one example, memory device 640 includes ODT as part of the interface hardware associated with I/O interface 642. In one example, I/O interface 672 is included in logic 680. In one example, either or both of I/O interface 672 and logic 680 can include ODT circuitry. In general, ODT can provide settings for impedance to be applied to the interface to specified signal lines. In one example, ODT is applied to DQ signal lines. In one example, ODT is applied to command signal lines. In one example, ODT is applied to address signal lines. In one example, ODT can be applied to any combination of the preceding. The ODT settings can be changed based on whether a memory device is a selected target of an access operation or a non-target device. ODT settings can affect the timing and reflections of signaling on the terminated lines. Careful control over ODT can enable higher-speed operation with improved matching of applied impedance and loading. ODT can be applied to specific signal lines of the I/O interfaces, and is not necessarily applied to all signal lines.

Memory device 640 includes controller 650, which represents control logic within the memory device to control internal operations within the memory device. For example, controller 650 includes command logic 652, which decodes commands sent by memory controller 620 and generates internal operations to execute or satisfy the commands. Controller 650 can be referred to as an internal controller, and is separate from memory controller 620 of the host. Controller 650 can determine what mode is selected based on register 644, and configure the internal execution of operations for access to memory resources 660 or other operations based on the selected mode. Controller 650 generates control signals to control the routing of bits within memory device 640 to provide a proper interface for the selected mode and direct a command to the proper memory locations or addresses.

Referring again to memory controller 620, memory controller 620 includes scheduler 630, which represents logic or circuitry to generate and order transactions to send to memory device 640. From one perspective, the primary function of memory controller 620 could be said to schedule memory access and other transactions to memory device 640. Such scheduling can include generating the transactions themselves to implement the requests for data by processor 610 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 620 typically includes logic to allow selection and ordering of transactions to improve performance of system 600. Thus, memory controller 620 can select which of the outstanding transactions should be sent to memory device 640 in which order, which is typically achieved with logic much more complex that a simple first-in first-out algorithm. Memory controller 620 manages the transmission of the transactions to memory device 640, and manages the timing associated with the transaction. In one example, transactions have deterministic timing, which can be managed by memory controller 620 and used in determining how to schedule the transactions.

Referring again to memory controller 620, memory controller 620 includes command (CMD) logic 624, which represents logic or circuitry to generate commands to send to memory devices 640. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 640, memory controller 620 can issue commands via I/O 622 to cause memory device 640 to execute the commands. In one example, controller 650 of memory device 640 receives and decodes command and address information received via I/O 642 from memory controller 620. Based on the received command and address information, controller 650 can control the timing of operations of the logic and circuitry within memory device 640 to execute the commands. Controller 650 is responsible for compliance with standards or specifications within memory device 640, such as timing and signaling requirements. Memory controller 620 can implement compliance with standards or specifications by access scheduling and control.

In one example, memory controller 620 includes refresh (REF) logic 626. Refresh logic 626 can be used for memory resources that are volatile and need to be refreshed to retain a deterministic state. In one example, refresh logic 626 indicates a location for refresh, and a type of refresh to perform. Refresh logic 626 can trigger self-refresh within memory device 640, and/or execute external refreshes by sending refresh commands. In one such example, system 600 supports all bank refreshes as well as per bank refreshes. All bank refreshes cause the refreshing of a selected bank within all memory devices 640 coupled in parallel. Per bank refreshes cause the refreshing of a specified bank within a specified memory device 640. In one example, controller 650 within memory device 640 includes refresh logic 654 to apply refresh within memory device 640. In one example, refresh logic 654 generates internal operations to perform refresh in accordance with an external refresh received from memory controller 620. Refresh logic 654 can determine if a refresh is directed to memory device 640, and what memory resources 660 to refresh in response to the command.

Thus, the system 600 includes elements that can implement C/A bus training techniques. The memory controller 620 can generate commands to enable detection of timing problems on the backside C/A bus, as described above.

FIG. 7 is a block diagram of an example of a computing system in which C/A bus training techniques can be implemented. System 700 represents a computing device in accordance with any example described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 can represent a "north bridge" circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one example, system 700 includes interface 714, which can be coupled to interface 712. Interface 714 can be a lower speed interface than interface 712. In one example, interface 714 can be a "south bridge" circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

FIG. 8 is a block diagram of an example of a mobile device in which C/A bus training techniques can be implemented. Device 800 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting device 800 to another device, or a combination. The processing operations can also include operations related to audio I/O, display I/O, or other interfacing, or a combination. Processor 810 can execute data stored in memory. Processor 810 can write or edit data stored in memory.

In one example, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 812 can also include sensors for biometric systems such as fingerprint recognition systems, face detection or recognition systems, or other systems that detect or recognize user features. Sensors 812 should be understood broadly, and not limiting on the many different types of sensors that could be implemented with system 800. In one example, one or more sensors 812 couples to processor 810 via a frontend circuit integrated with processor 810. In one example, one or more sensors 812 couples to processor 810 via another component of system 800.

In one example, device 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 800, or connected to device 800. In one example, a user interacts with device 800 by providing audio commands that are received and processed by processor 810.

Display subsystem 830 represents hardware (e.g., display devices) and software components (e.g., drivers) that provide a visual display for presentation to a user. In one example, the display includes tactile components or touchscreen elements for a user to interact with the computing device. Display subsystem 830 includes display interface 832, which includes the particular screen or hardware device used to provide a display to a user. In one example, display interface 832 includes logic separate from processor 810 (such as a graphics processor) to perform at least some processing related to the display. In one example, display subsystem 830 includes a touchscreen device that provides both output and input to a user. In one example, display subsystem 830 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, display subsystem includes a touchscreen display. In one example, display subsystem 830 generates display information based on data stored in memory or based on operations executed by processor 810 or both.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one example, I/O controller 840 manages devices such as accelerometers, cameras, light sensors or other environmental sensors, gyroscopes, global positioning system (GPS), or other hardware that can be included in device 800, or sensors 812. The input can be part of direct user interaction, as well as providing environmental input to the system to influence its operations (such as filtering for noise, adjusting displays for brightness detection, applying a flash for a camera, or other features).

In one example, device 800 includes power management 850 that manages battery power usage, charging of the battery, and features related to power saving operation. Power management 850 manages power from power source 852, which provides power to the components of system 800. In one example, power source 852 includes an AC to DC (alternating current to direct current) adapter to plug into a wall outlet. Such AC power can be renewable energy (e.g., solar power, motion based power). In one example, power source 852 includes only DC power, which can be provided by a DC power source, such as an external AC to DC converter. In one example, power source 852 includes wireless charging hardware to charge via proximity to a charging field. In one example, power source 852 can include an internal battery or fuel cell source.

Memory subsystem 860 includes memory device(s) 862 for storing information in device 800. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one example, memory subsystem 860 includes memory controller 864 (which could also be considered part of the control of system 800, and could potentially be considered part of processor 810). Memory controller 864 includes a scheduler to generate and issue commands to control access to memory device 862.

Connectivity 870 includes hardware devices (e.g., wireless or wired connectors and communication hardware, or a combination of wired and wireless hardware) and software components (e.g., drivers, protocol stacks) to enable device 800 to communicate with external devices. The external device could be separate devices, such as other computing devices, wireless access points or base stations, as well as peripherals such as headsets, printers, or other devices. In one example, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading, uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Thus, one or more examples described herein involve measuring CA signal timing margins from the RCD to DRAM ranks used on DIMMs that include an RCD, such as RDIMMs and LRDIMMs. In one example, CA parity detection is enabled on the target rank and disabled on the RCD input and non-target ranks. This causes the RCD to accept commands with invalid CA parity and the non-target ranks to not signal ALERT. The target DRAM rank is configured to check for valid CA parity and signal ALERT on parity error, in accordance with one example. CA patterns can be controlled before and after the target command by sending commands to a non-target rank with invalid CA parity. The memory controller can then detect a command margin failure on the target rank by checking for ALERT signal assertion due to bad CA parity. For example, as the RCD CA output timing is margined to the point of failure, the target rank command will eventually be sampled on a clock cycle containing invalid CA parity. At that time, ALERT will be signaled by the DRAM to the RCD and passed through to the host controller. After the command margin failure, a DRAM reset and initialization sequence can be used to restore the DRAM to a known good state. This margining process is repeated for both setup and hold regions of the target rank command. Optimization of the CA signal timing from RCD to DRAMs can enable DIMMS to be operated at higher frequencies by providing a method to balance CA setup/hold times within the existing command "eye", thus enabling reliable operation at higher frequencies.

Flow diagrams as illustrated herein provide examples of sequences of various process actions. The flow diagrams can indicate operations to be executed by a software or firmware routine, as well as physical operations. In one example, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various examples; thus, not all actions are required in every embodiment. Other process flows are possible.

Examples of devices, systems, and methods to train a command/address bus follow. In one example, a method of training a command/address (C/A) bus, including training internal command/address (C/A) signal lines of a memory module, involves transmitting a first command to a DRAM with parity checking enabled, the first command to include valid parity and chip select asserted. The method also involves transmitting commands in cycles before and after the first command to at least one DRAM with parity checking disabled, the commands to include invalid parity and chip select asserted. In response to detecting a parity error, the method involves modifying a timing parameter to adjust timing for the internal C/A signal lines of the memory module. In one such example, the method involves disabling parity checking for a register of a memory module, the register including logic to transmit commands received from a memory controller to one or more DRAMs of the memory module via the internal C/A signal lines of the memory module. In one example, the method further involves disabling parity checking for the at least one DRAM of the memory module. Disabling parity checking for the at least one DRAM can include disabling parity checking for a rank that includes the at least one DRAM. In one example, transmitting the first command can include transmitting a no operation (NOP) command or an activate (ACT) command. In one example, transmitting the commands in the cycles before and after the first command includes transmitting no operation (NOP) commands or mode register set (MRS) commands. In one example, modifying a timing parameter to adjust timing for the internal C/A signal lines of the memory module involves modifying a register to add a delay to signals on the internal C/A signal lines, to signals on internal chip select (CS) signal lines, or to signals on internal clock (CK) signal lines between the register and the DRAMs of the memory module. In one example, transmitting the first command and the commands in the cycles before and after the first command includes causing transitions of low-high-low or high-low-high on at least one C/A signal line. In one example, the method further involves transmitting a sequence of commands twice, including once with a transition of low-high-low on the at least one C/A signal line, and a second time with a transition of high-low-high on the at least one C/A signal line, wherein the sequence of commands includes the first command and the commands in the cycles before and after the first command. In one such example, the method further involves for each C/A signal line of a plurality of C/A signal lines: transmitting the sequence of commands twice, once with a transition of low-high-low on the C/A signal line, and a second time with a transition of high-low-high on the C/A signal line. In one example, the plurality of C/A signals includes: a parity signal (PAR), an activate signal (ACT), address signals (A[17:0], C[2:0], BG[1:0], BA[1:0]), row address strobe (RAS), column address strobe (CAS), and a write enable signal (WE).

In one example, a memory controller includes logic to generate commands to train a command/address (C/A) bus, including to train internal command/address (C/A) signal lines of a memory module, input/output (I/O) circuitry to transmit the commands to the memory module, including to: transmit a first command to a DRAM with parity checking enabled, the first command to include valid parity and chip select asserted, transmit commands in cycles before and after the first command to at least one DRAM with parity checking disabled, the commands to include invalid parity and chip select asserted, and in response to detecting a parity error, transmit a command to the memory module to modify a timing parameter to adjust timing for the internal C/A signal lines of the memory module. In one example, the input/output (I/O) circuitry is to further transmit a command to disable parity checking for a register of a memory module, the register including logic to transmit commands received from a memory controller to one or more DRAMs of the memory module via the internal C/A signal lines of the memory module. In one embodiment, the input/output (I/O) circuitry is to further transmit a command to disable parity checking for the at least one DRAM of the memory module. In one example, the command to disable parity checking for the at least one DRAM includes: a command to disable parity checking for a rank that includes the at least one DRAM. In one example, the first command includes: a no operation (NOP) command or an activate (ACT) command. In one example, the commands in the cycles before and after the first command include: no operation (NOP) commands or mode register set (MRS) commands. In one example, the timing parameter to adjust timing for the internal C/A signal lines include a delay to signals on the internal C/A signal lines, a delay to signals on internal chip select (CS) signal lines, or a delay to signals on internal clock (CK) signal lines between the register and the DRAMs of the memory module. In one example, the transmission of the first command and the commands in the cycles before and after the first command is to cause transitions of low-high-low or high-low-high on at least one C/A signal line. In one example, the I/O circuitry is to further: transmit a sequence of commands twice, including once with a transition of low-high-low on the at least one C/A signal line, and a second time with a transition of high-low-high on the at least one C/A signal line, wherein the sequence of commands includes the first command and the commands in the cycles before and after the first command. In one example, the I/O circuitry is to further: for each C/A signal line of a plurality of C/A signal lines: transmit the sequence of commands twice, once with a transition of low-high-low on the C/A signal line, and a second time with a transition of high-low-high on the C/A signal line. In one example, the plurality of C/A signals includes: a parity signal (PAR), an activate signal (ACT), address signals (A[17:0], C[2:0], BG[1:0], BA[1:0]), row address strobe (RAS), column address strobe (CAS), and a write enable signal (WE).

In one example, a system includes logic to cause a memory controller to generate commands to train a command/address (C/A) bus, including to train internal command/address (C/A) signals of a memory module, and the memory controller including input/output (I/O) circuitry to transmit the commands to the memory module, including to: transmit a first command to a DRAM with parity checking enabled, the first command to include valid parity and chip select asserted, transmit commands in cycles before and after the first command to at least one DRAM with parity checking disabled, the commands to include invalid parity and chip select asserted, and in response to detecting a parity error, transmit a command to the memory module to modify a timing parameter to adjust timing for the internal C/A signal lines of the memory module. In one example, the logic to cause the memory controller to generate commands to train the C/A bus includes a module driver or a basic input/output system (BIOS). In one example, the system further includes a processor to cause the memory controller to generate the commands to train the C/A bus.

In one example, a memory module includes multiple dynamic random access memories (DRAMs), a register including logic to receive commands from a memory controller and transmit the commands to one or more DRAMs via the internal C/A signal lines of the memory module, the register to: receive a first command from the memory controller and transmit the first command to a DRAM with parity checking enabled, the first command to include valid parity and chip select asserted, receive commands in cycles before and after the first command, and transmit the commands to at least one DRAM with parity checking disabled, the commands to include invalid parity and chip select asserted, and logic to, in response to detecting a parity error from the DRAM, signal the parity error to the memory controller, wherein the memory controller is to modify a timing parameter to adjust timing for the internal C/A signal lines of the memory module in response to the parity error. In one example, the register further includes a mode register to disable parity checking for the register. In one example, the memory module further includes one or more mode registers to disable parity checking for the DRAMs. In one example, the one or more mode registers include a register to disable parity checking for a rank. In one example, the memory module further includes one or more mode registers to store the timing parameter to adjust timing for the internal C/A signal lines, including one or more of: a delay to signals on the internal C/A signal lines, a delay to signals on internal chip select (CS) signal lines, or a delay to signals on internal clock (CK) signal lines between the register and the DRAMs of the memory module. In one example, transmission (and receipt) of the first command and the commands in the cycles before and after the first command is to cause transitions of low-high-low or high-low-high on at least one C/A signal line. In one example, the register is to transmit a sequence of commands twice, including once with a transition of low-high-low on the at least one C/A signal line, and a second time with a transition of high-low-high on the at least one C/A signal line, wherein the sequence of commands includes the first command and the commands in the cycles before and after the first command. In one example, for each C/A signal line of a plurality of C/A signal lines: the register is to transmit the sequence of commands twice, once with a transition of low-high-low on the C/A signal line, and a second time with a transition of high-low-high on the C/A signal line.

In one embodiment, a method (which can be performed by a driver and/or BIOS, for example) to train a command/address (C/A) bus involves causing a memory controller to transmit a first command to a DRAM with parity checking enabled and valid parity, causing the memory controller to issue commands in cycles before and after the first command to at least one DRAM with parity checking disabled and invalid parity, detecting whether a parity error occurred, and in response to detection of a parity error, causing the memory controller to modify a timing parameter to adjust timing for the internal C/A signal lines of the memory module. In one example, the method further involves causing the memory controller to disable parity checking for a register of a memory module, the register including logic to transmit commands received from a memory controller to one or more DRAMs of the memory module via the internal C/A signal lines of the memory module. In one example, the method includes causing the memory controller to disable parity checking for the at least one DRAM of the memory module. In one example, disabling parity checking for the at least one DRAM involves disabling parity checking for a rank that includes the at least one DRAM. In one example, the method further involves causing the memory controller to transmit a sequence of commands twice, including once with a transition of low-high-low on the at least one C/A signal line, and a second time with a transition of high-low-high on the at least one C/A signal line, wherein the sequence of commands includes the first command and the commands in the cycles before and after the first command. In one example, the method involves, for each C/A signal line of a plurality of C/A signal lines: causing the memory controller to transmit the sequence of commands twice, once with a transition of low-high-low on the C/A signal line, and a second time with a transition of high-low-high on the C/A signal line. In one example, an article of manufacture including a computer readable storage medium having content stored thereon which when accessed causes the performance of operations to execute a method for training a command/address (C/A) bus in accordance with any of the methods described herein.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory controller comprising:
    logic to generate commands to train a command/address (C/A) bus; and
    input/output (I/O) circuitry to transmit the commands to DRAMs of a memory module, including to:
        transmit a first command with chip select asserted to a DRAM with parity checking enabled, transmission of the first command to include transmission of valid parity over a parity signal line;
        transmit commands with chip select asserted in cycles before and after the first command to at least one DRAM with parity checking disabled, transmission of the commands to include transmission of invalid parity over the parity signal line; and
        in response to detecting a parity error, transmit a command to the memory module to modify a timing parameter to adjust timing for internal C/A signal lines of the memory module.

2. The memory controller of claim 1, wherein:
    the input/output (I/O) circuitry is to further transmit a command to disable parity checking for a register of a memory module, the register including logic to transmit commands received from a memory controller to one or more DRAMs of the memory module via the internal C/A signal lines of the memory module.

3. The memory controller of claim 1, wherein:
    the input/output (I/O) circuitry is to further transmit a command to disable parity checking for the at least one DRAM of the memory module.

4. The memory controller of claim 3, wherein the command to disable parity checking for the at least one DRAM comprises: a command to disable parity checking for a rank that includes the at least one DRAM.

5. The memory controller of claim 1, wherein the first command comprises:
    a no operation (NOP) command or an activate (ACT) command.

6. The memory controller of claim 1, wherein the commands in the cycles before and after the first command comprise: no operation (NOP) commands or mode register set (MRS) commands.

7. The memory controller of claim 1, wherein the timing parameter to adjust timing for the internal C/A signal lines comprises:
    a delay to signals on the internal C/A signal lines, a delay to signals on internal chip select (CS) signal lines, or a delay to signals on internal clock (CK) signal lines between a register of the memory module and the DRAMs of the memory module.

8. The memory controller of claim 1, wherein the transmission of the first command and the commands in the cycles before and after the first command is to cause transitions of low-high-low or high-low-high on at least one C/A signal line.

9. The memory controller of claim 8, wherein the I/O circuitry is to further:
    transmit a sequence of commands twice, including once with a transition of low-high-low on the at least one C/A signal line, and a second time with a transition of high-low-high on the at least one C/A signal line;
    wherein the sequence of commands includes the first command and the commands in the cycles before and after the first command.

10. The memory controller of claim 9, wherein the I/O circuitry is to further:
    for each C/A signal line of a plurality of C/A signal lines:
        transmit the sequence of commands twice, once with a transition of low-high-low on the C/A signal line, and a second time with a transition of high-low-high on the C/A signal line.

11. The memory controller of claim 10, wherein a plurality of C/A signals to be transmitted via the plurality of C/A signal lines includes: a parity signal (PAR), an activate signal (ACT), address signals (A[17:0], C[2:0], BG[1:0], BA[1:0]), row address strobe (RAS), column address strobe (CAS), and a write enable signal (WE).

12. A memory module comprising:
    multiple dynamic random access memories (DRAMs);
    a register including logic to receive commands from a memory controller and transmit the commands to one or more DRAMs via internal C/A signal lines of the memory module, the register to:
        receive a first command with chip select asserted from the memory controller and transmit the first command to a DRAM with parity checking enabled, transmission of the first command to include transmission of valid parity over a parity signal line;
        receive commands with chip select asserted in cycles before and after the first command, and transmit the commands to at least one DRAM with parity checking disabled, transmission of the commands to include transmission of invalid parity over the parity signal line; and
    logic to, in response to detecting a parity error from the DRAM, signal the parity error to the memory controller, wherein the memory controller is to modify a timing parameter to adjust timing for the internal C/A signal lines of the memory module in response to the parity error.

13. The memory module of claim 12, wherein the first command comprises: a no operation (NOP) command or an activate (ACT) command.

14. The memory module of claim 12, wherein the commands in the cycles before and after the first command comprise: no operation (NOP) commands or mode register set (MRS) commands.

15. The memory module of claim 12, further comprising: one or more mode registers to store the timing parameter to adjust timing for the internal C/A signal lines, including one or more of: a delay to signals on the internal C/A signal lines, a delay to signals on internal chip select (CS) signal lines, or a delay to signals on internal clock (CK) signal lines between the register and the DRAMs of the memory module.

16. The memory module of claim 12, wherein transmission of the first command and the commands in the cycles before and after the first command is to cause transitions of low-high-low or high-low-high on at least one C/A signal line.

17. The memory module of claim 16, wherein the register is to:
    transmit a sequence of commands twice, including once with a transition of low-high-low on the at least one C/A signal line, and a second time with a transition of high-low-high on the at least one C/A signal line;
    wherein the sequence of commands includes the first command and the commands in the cycles before and after the first command.

18. The memory module of claim 17, wherein:
    for each C/A signal line of a plurality of C/A signal lines:
        the register is to transmit the sequence of commands twice, once with a transition of low-high-low on the C/A signal line, and a second time with a transition of high-low-high on the C/A signal line.

19. A system comprising:
    logic to cause a memory controller to generate commands to train a command/address (C/A) bus; and
    the memory controller including input/output (I/O) circuitry to transmit the commands to DRAMs of a memory module, including to:
        transmit a first command with chip select asserted to a DRAM with parity checking enabled, transmission of the first command to include transmission of valid parity over a parity signal line;
        transmit commands with chip select asserted in cycles before and after the first command to at least one DRAM with parity checking disabled, transmission of the commands to include transmission of invalid parity over the parity signal line; and
        in response to detecting a parity error, transmit a command to the memory module to modify a timing parameter to adjust timing for internal C/A signal lines of the memory module.

20. The system of claim 19, wherein the logic to cause the memory controller to generate commands to train the C/A bus comprises a module driver or a basic input/output system (BIOS).

* * * * *